US010283996B2

(12) United States Patent
Fetterman et al.

(10) Patent No.: US 10,283,996 B2
(45) Date of Patent: May 7, 2019

(54) PACKAGING FOR AN ELECTRONIC DEVICE

(71) Applicant: Apple Inc., Cupertino, CA (US)

(72) Inventors: Kevin Scott Fetterman, Los Altos, CA (US); Jonathan Berk, Mountain View, CA (US); Daniel David Hershey, Los Gatos, CA (US); Alissa Anderson, San Francisco, CA (US); Margaret Madigan Burke, Sunnyvale, CA (US); Jack Wanderman, San Francisco, CA (US); Brett Evans Krasniewicz, Santa Clara, CA (US); Peter Coxeter, Cupertino, CA (US); Benjamin Arthur Stevenson, Oakland, CA (US); Matthew Phillip Casebolt, Fremont, CA (US); Felix Chung Fan Lam, Campbell, CA (US); Robert Michael Merritt, Guangdong (CN); Mark Toki Niiro, San Jose, CA (US)

(73) Assignee: Apple Inc., Cupertino, CA (US)

( * ) Notice: Subject to any disclaimer, the term of this patent is extended or adjusted under 35 U.S.C. 154(b) by 429 days.

(21) Appl. No.: 14/835,396

(22) Filed: Aug. 25, 2015

(65) Prior Publication Data
US 2016/0064993 A1 Mar. 3, 2016

Related U.S. Application Data

(60) Provisional application No. 62/045,476, filed on Sep. 3, 2014, provisional application No. 62/129,608, filed on Mar. 6, 2015.

(51) Int. Cl.
*H02J 7/00* (2006.01)
*H02J 7/02* (2016.01)

(52) U.S. Cl.
CPC ............ *H02J 7/025* (2013.01); *H02J 7/0042* (2013.01); *H02J 7/0044* (2013.01)

(58) Field of Classification Search
CPC ......... H02J 7/025; H02J 7/0044; H02J 7/0042
(Continued)

(56) References Cited

U.S. PATENT DOCUMENTS

2003/0205577 A1  11/2003  Au
2003/0230501 A1  12/2003  Smolev
(Continued)

FOREIGN PATENT DOCUMENTS

CN  2204781 Y  8/1995
CN  1649780 A  8/2005
(Continued)

OTHER PUBLICATIONS

International Search Report and Written Opinion, published Mar. 10, 2016, for International Patent Application No. PCT/US2015/047557, filed Aug. 28, 2015.

*Primary Examiner* — Richard V Muralidar
(74) *Attorney, Agent, or Firm* — Sterne, Kessler, Goldstein & Fox P.L.L.C.

(57) ABSTRACT

Packaging is disclosed. The packaging may include a charging element to charge an electronic device contained within the packaging. The charging may be performed by inductive charging. The packaging may include a magnet to position and retain an item within the packaging. The packaging may include protective surfaces formed of microfiber to help protect an item contained therein. The microfiber may be debossed around its periphery to minimize interruption between the microfiber and an underlying surface to which it is applied.

26 Claims, 35 Drawing Sheets

(58) Field of Classification Search
USPC .......................................... 320/107, 108, 115
See application file for complete search history.

(56) References Cited

U.S. PATENT DOCUMENTS

| | | | | |
|---|---|---|---|---|
| 2010/0219183 A1* | 9/2010 | Azancot | ................. | H01F 38/14 |
| | | | | 219/676 |
| 2010/0264871 A1* | 10/2010 | Matouka | ................. | H02J 7/025 |
| | | | | 320/108 |
| 2011/0006611 A1* | 1/2011 | Baarman | ................. | H01F 38/14 |
| | | | | 307/104 |
| 2012/0169275 A1 | 7/2012 | Lee et al. | | |

FOREIGN PATENT DOCUMENTS

| | | | |
|---|---|---|---|
| CN | 101067277 | A | 11/2007 |
| CN | 101140635 | A | 3/2008 |
| CN | 201674242 | U | 12/2010 |
| CN | 101937273 | A | 1/2011 |
| CN | 201995802 | U | 10/2011 |
| CN | 102897432 | A | 1/2013 |
| CN | 203111753 | U | 8/2013 |
| CN | 203301184 | U | 11/2013 |
| CN | 103633706 | A | 3/2014 |
| CN | 203491750 | U | 3/2014 |
| CN | 203562800 | U | 4/2014 |
| CN | 203607891 | U | 5/2014 |
| EP | 2075197 | A1 | 7/2009 |
| JP | 2005-278318 | A | 10/2005 |
| WO | 2007/068079 | A1 | 6/2007 |

* cited by examiner

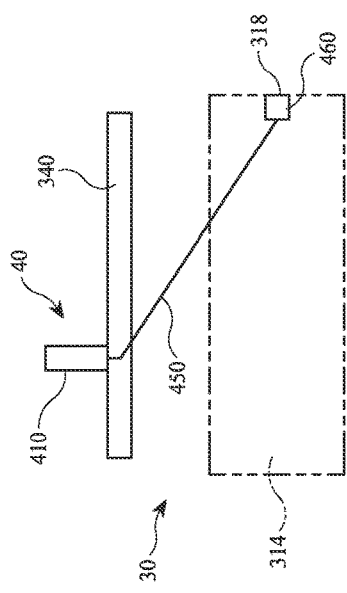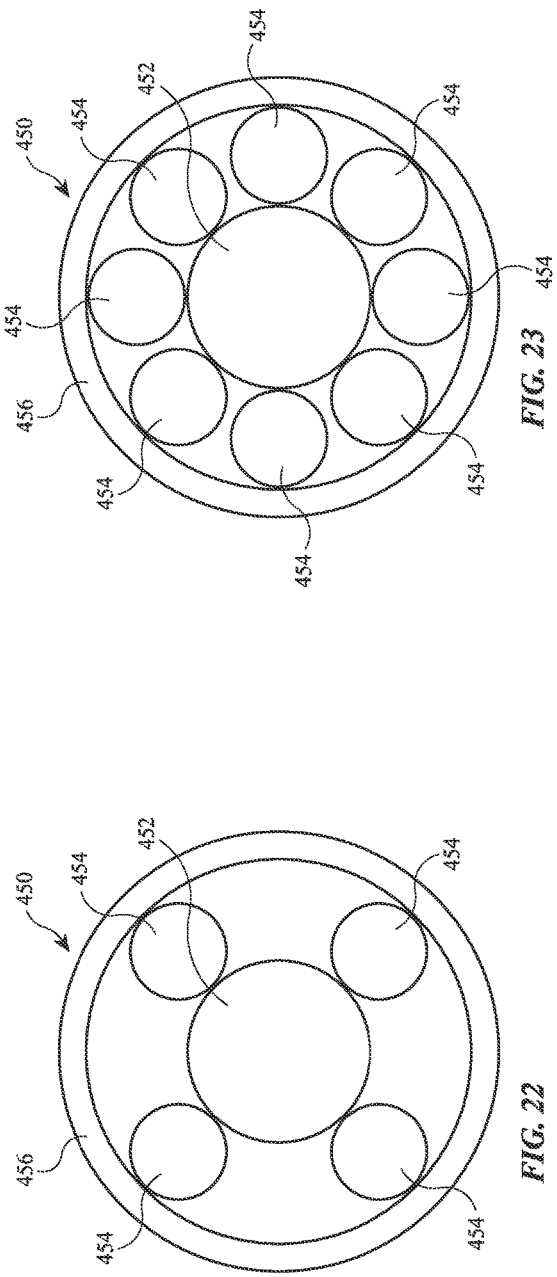

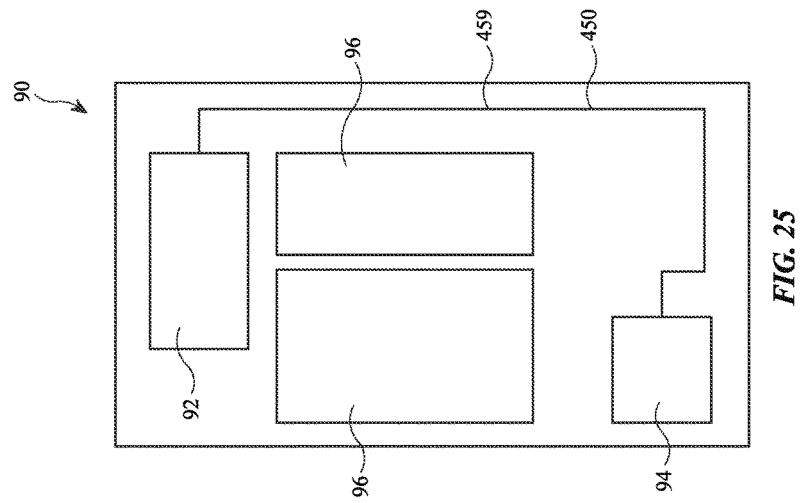
FIG. 25
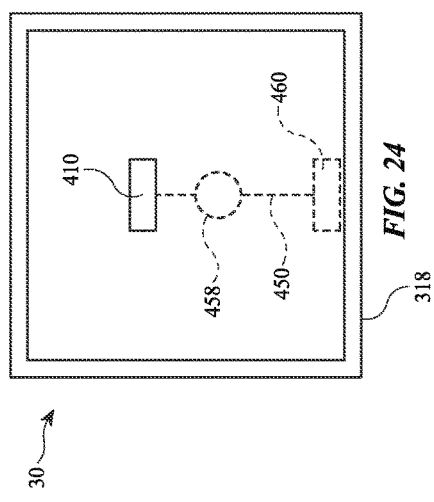
FIG. 24
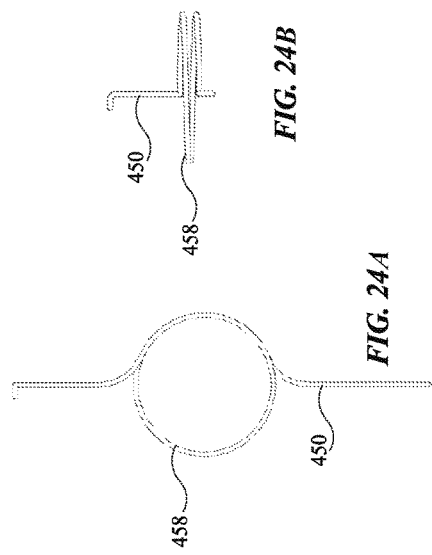
FIG. 24B
FIG. 24A

PACKAGING FOR AN ELECTRONIC DEVICE

CROSS-REFERENCE TO RELATED APPLICATION(S)

This application claims priority to U.S. Provisional Application No. 62/045,476, filed on Sep. 3, 2014, and U.S. Provisional Application No. 62/129,608, filed on Mar. 6, 2015, each of which is incorporated herein in its entirety by reference thereto.

FIELD

The described embodiments relate generally to packaging. More particularly, the present embodiments relate to packaging for electronic devices.

BACKGROUND

Electronic devices are often shipped and sold in packaging. Packaging may help to protect the devices from potential damage.

SUMMARY

Some embodiments of the present invention provide packaging including a base shell containing a surface for receiving an item, a charging element disposed above the item-receiving surface, and an electrical port coupled to the base shell and accessible from an outer side of the base shell, wherein the electrical port is electrically connected to the charging element.

Some embodiments of the present invention provide packaging including a base shell defining a cavity, a tray assembly disposed in the cavity and defining an upper surface for receiving an item, and a magnet disposed within the cavity between the base and the tray assembly, and wherein the magnetic field of the magnet extends above the upper surface of the tray assembly.

Some embodiments of the present invention provide packaging including a shell with a first wall and a second wall protruding from a perimeter of the first wall, where the first wall and second wall together define a cavity. The packaging may also include a protective layer disposed within the cavity, wherein an outer periphery of the protective layer is debossed and coupled to a surface of the cavity.

Some embodiments of the present invention provide a method for providing power to a device, where the method includes tilting a charging element from a neutral position to a charging position under force of magnetic attraction of the charging element to the device, and transferring power to the device from the charging element when the charging element is in the charging position. In some embodiments the magnetic force overcomes a biasing force applied by a support structure for a charging element. In some embodiments the charging element includes an inductive coil and power is transferred to the device via an electromagnetic field.

BRIEF DESCRIPTION OF THE DRAWINGS

The disclosure will be readily understood by the following detailed description in conjunction with the accompanying drawings, wherein like reference numerals designate like structural elements, and in which:

FIG. 21 shows a blind assembly of a packaging system according to embodiments of the present invention.

FIG. 22 shows an end view of a wire according to embodiments of the present invention.

FIG. 23 shows an end view of a wire according to embodiments of the present invention.

FIG. 24 shows a packaging system according to embodiments of the present invention.

FIGS. 24A and 24B show a wire according to embodiments of the present invention.

FIG. 25 shows an electronic device according to embodiments of the present invention.

DETAILED DESCRIPTION

Figure 1:
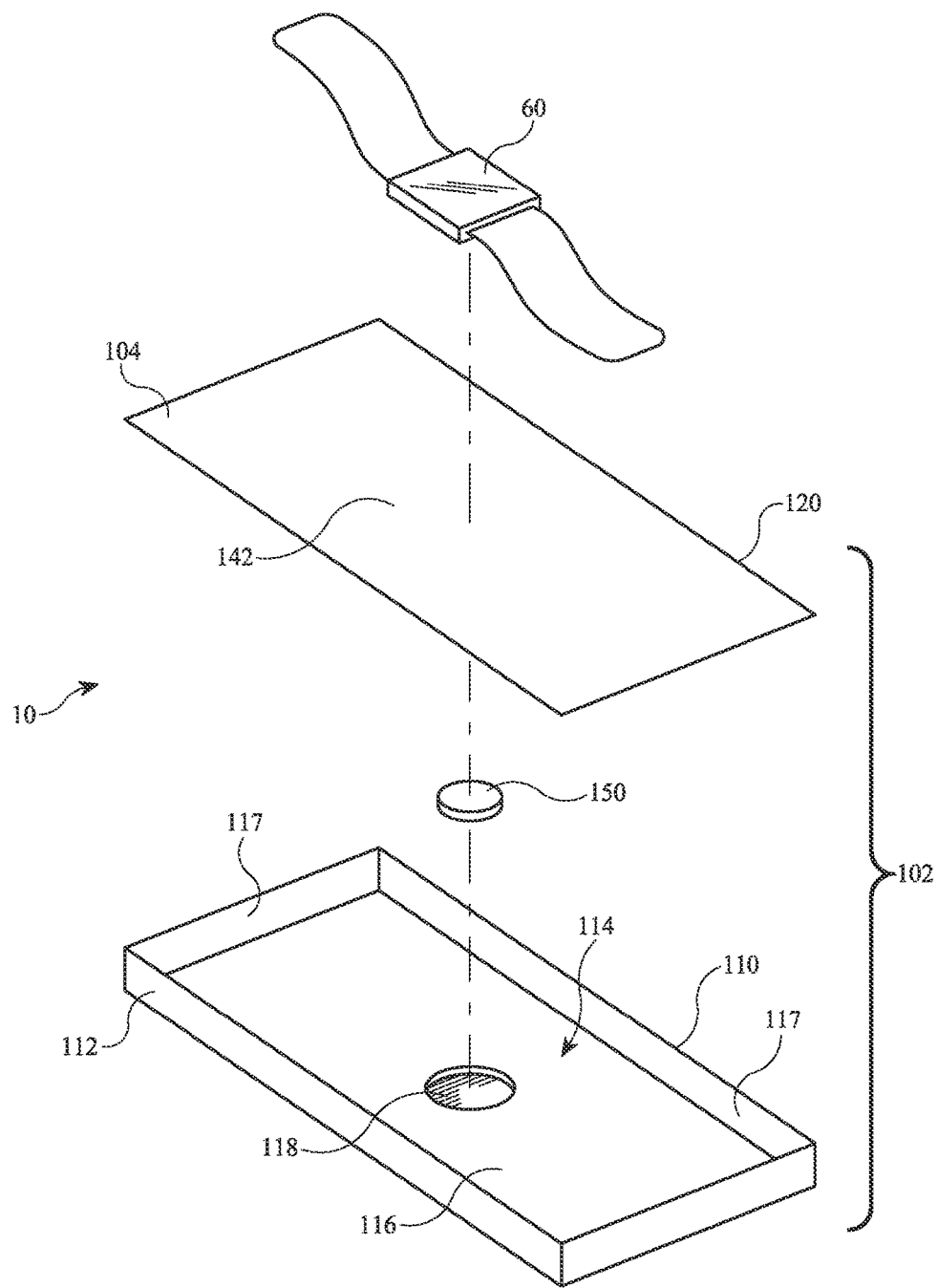
FIG. 1 shows an exploded perspective view of a packaging system according to embodiments of the present invention.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The following disclosure relates to packaging for electronic devices. Packaging may be of varying quality. For example, a plastic bag or paper wrapping might serve to package an item, or for greater protection, a padded cardboard box might be used. Typically, however, packaging is temporary and disposable; once an end user removes a purchased item from its packaging, the packaging is discarded.

In some embodiments of the present invention, however, packaging for an electronic device serves a continuing purpose throughout the life of the device it contains. In some embodiments the disclosed packaging serves as a case for storing and protecting the device, and/or a dock for powering the device. In such embodiments the packaging may include more robust structural features than typical packaging, and may include protective interior surfaces to protect the stored device throughout repeated usage. As used herein, "packaging" also encompasses product cases and docks. For example, the term "packaging" may include retail packaging, protective product cases, product display cases, and product docks; but its use is not limited to these categories.

In some embodiments, in order to help retain a device within the packaging, in some embodiments it includes a magnet that can attract a device placed in the packaging (e.g., by attracting metal or another magnet within the device). This can help locate the device in the optimum position within the packaging for ease of access and to minimize damage.

In some embodiments the disclosed packaging also serves as a charging station for the electronic device, thereby providing a convenient place to store and supply power to the device. In some embodiments the charger is an inductive charger, which allows a user to simply place his device within the packaging to charge it, without having to plug a power wire into the device.

These and other embodiments are discussed below with reference to the figures. However, those skilled in the art will readily appreciate that the detailed description given herein with respect to these figures is for explanatory purposes only and should not be construed as limiting.

FIGS. 1-4 illustrate packaging 10 according to some embodiments of the present invention. Packaging 10 includes a base assembly 102 and a lid assembly 106. Base assembly 102 and lid assembly 106 are separable from each other, and can be coupled together to enclose an inner area, within which an item 60 may be stored. Item 60 may be any type of item, and in some embodiments it is an electronic device such as a smartphone, a portable music player, a wearable device such as a watch (e.g., a smartwatch), or a portable computer (e.g., a laptop or tablet).

Figure 3:
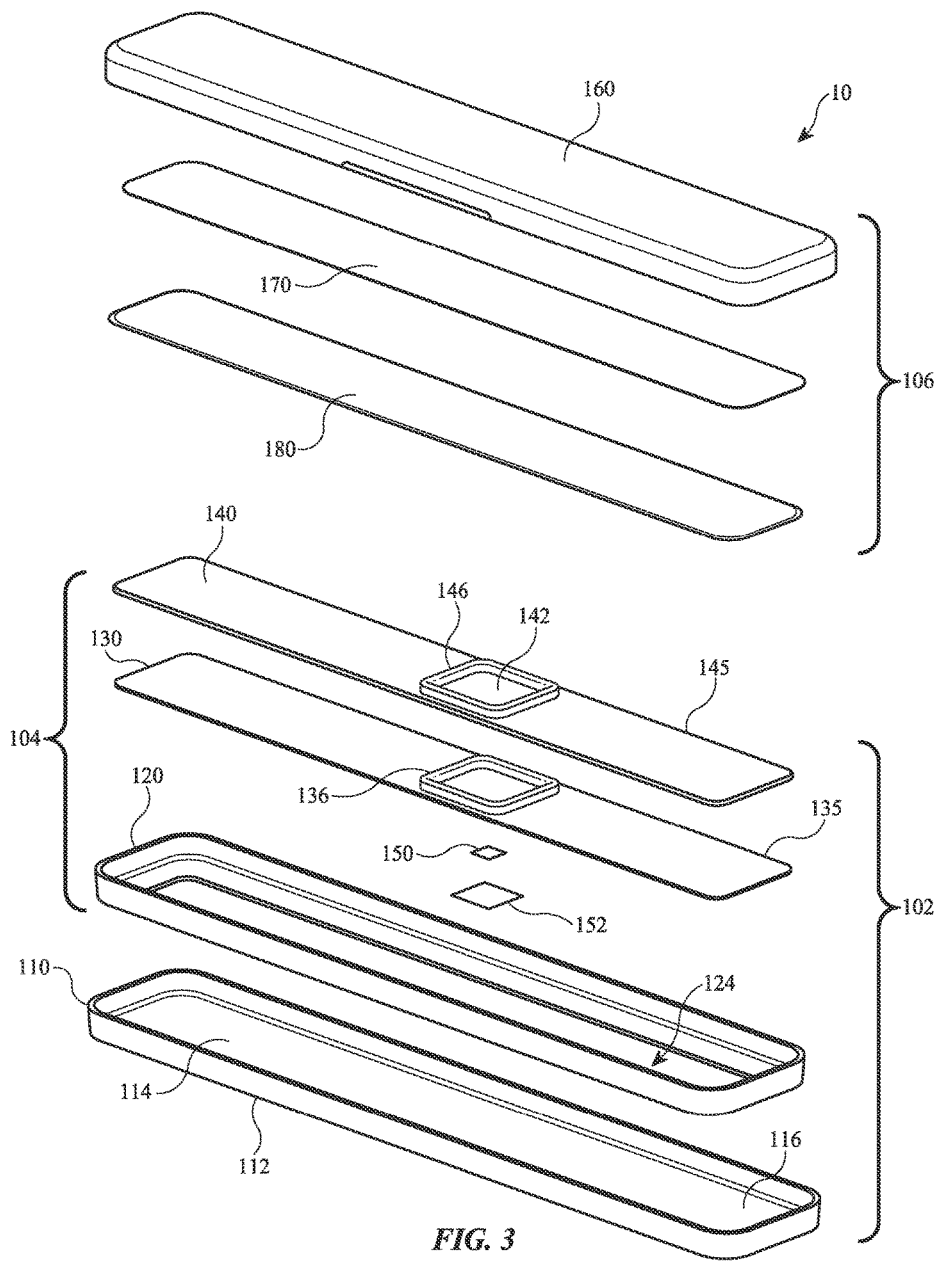
FIG. 3 shows an exploded perspective view of the packaging system of FIG. 2 according to embodiments of the present invention.
Figure 4:
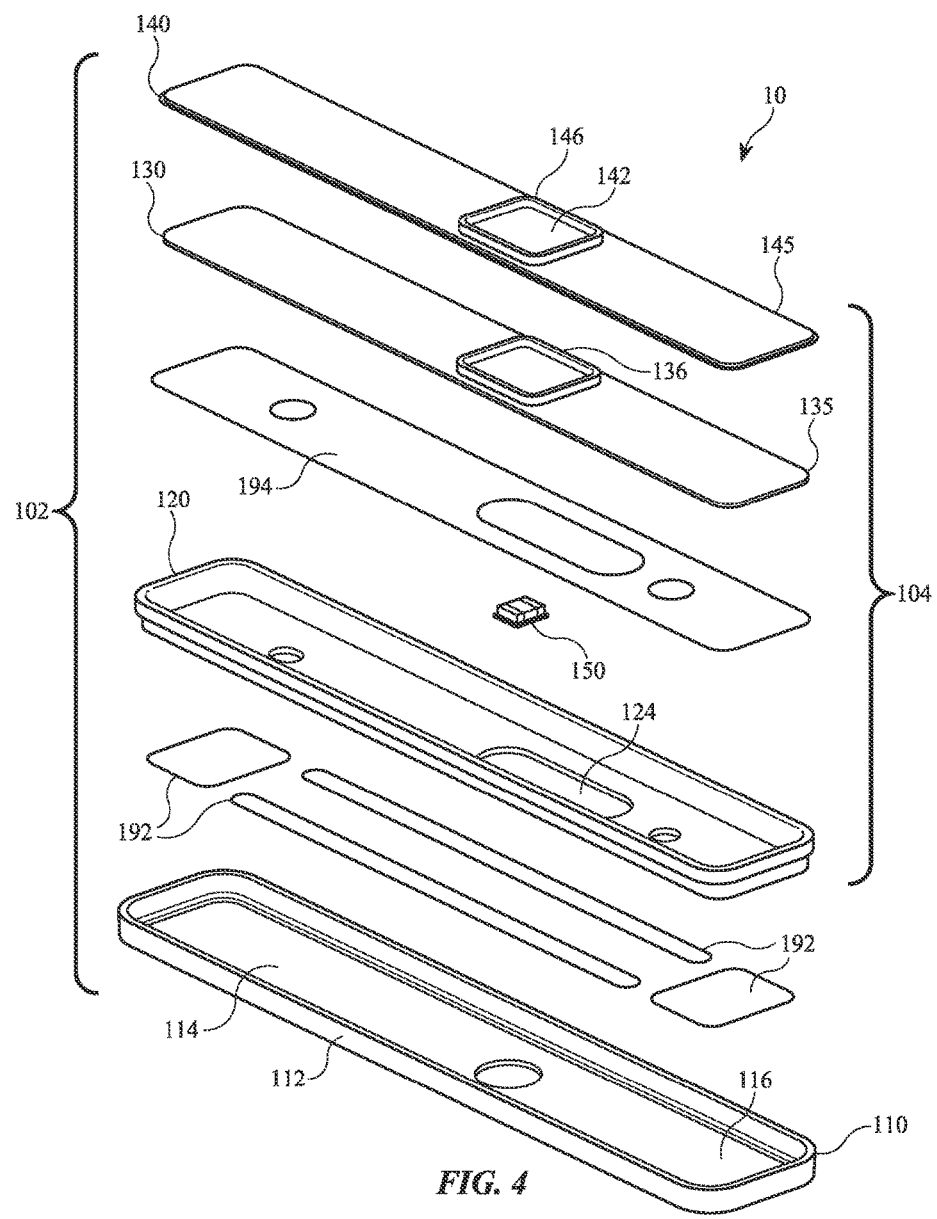
FIG. 4 shows an alternate exploded perspective view of the packaging system of FIG. 2 according to embodiments of the present invention.
Figure 9:
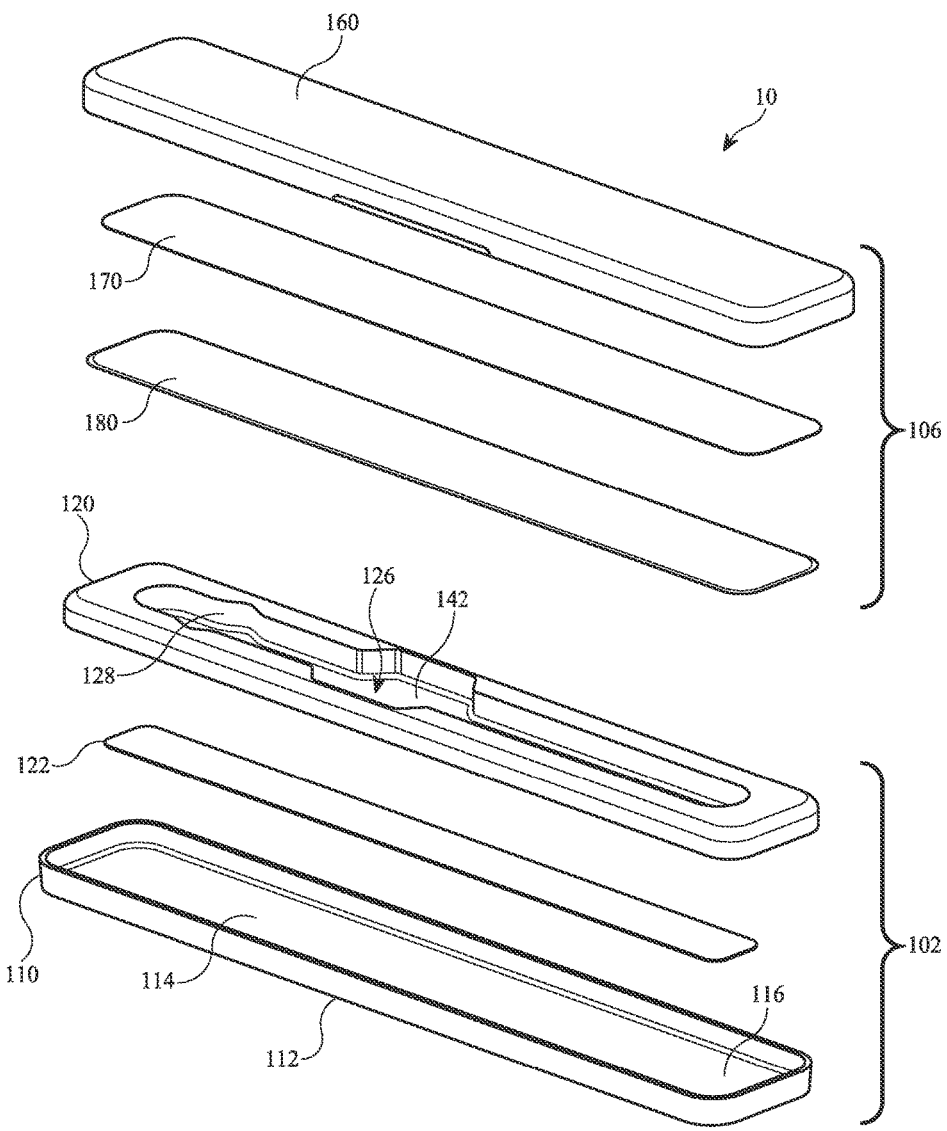
FIG. 9 shows an exploded perspective view of the packaging system of FIG. 8 according to embodiments of the present invention.

FIG. 1 shows base assembly 102 in an exploded view, along with item 60. Base assembly 102 may include a base shell 110 and a tray assembly 104. Tray assembly 104 may be formed from a single tray 120, as shown in FIGS. 1 and 9, or an assembly of multiple components as shown in FIGS. 3 and 4.

Base shell 110 may be formed of a material having a relatively high hardness (e.g., as compared to some internal packaging components as will be described), sufficient to maintain its shape and protect internal components of packaging 10 and item 60 contained therein. For example, base shell 110 may be formed of molded or machined plastic (e.g., polycarbonate) or metal (e.g., aluminum). In some embodiments base shell 110 forms an outer side surface 112 and an inner cavity 114. Cavity 114 may at least partially contain internal components of packaging 10 and item 60.

Tray assembly may include an item-receiving layer having an item-receiving surface 142 upon which item 60 may be retained within packaging 10. Item-receiving surface 142 may be formed of a material having a relatively low hardness (e.g., as compared to base shell 110), to protect item 60, which comes into contact with item-receiving surface 142 when item 60 is stored within packaging 10. For example, item-receiving surface 142 may be formed of a microfiber material.

In some embodiments, tray assembly 104 is received within cavity 114 of base shell 110. In some embodiments outer dimensions of tray assembly 104 match inner dimensions of cavity 114 formed by side surfaces 117 thereof. This dimensional correspondence helps maintain the position of tray assembly 104 relative to base shell 110, which in turn helps maintain the position of item 60.

In some embodiments, item 60 is maintained in position relative to item-receiving surface 142 by a magnet 150 disposed below item-receiving surface 142. In some embodiments, magnet 150 is a permanent magnet, and is disposed in contact with or just below a bottom surface of tray assembly 104. For example, in order to position magnet 150 at the desired position relative to tray assembly 104, magnet 150 may be disposed within a sub-cavity 118 formed in a bottom surface 116 of cavity 114 (see FIGS. 1 and 5) and/or may be disposed on a shunt 152 disposed on bottom surface 116 (see FIG. 3). Locating magnet 150 in sub-cavity 118 helps minimize its interference with lower portions of tray assembly 104, so that tray assembly 104 can fit flush against the rest of bottom surface 142. In some embodiments an adhesive 192 is used to secure tray assembly 104 to bottom surface 116, and this flush fit may provide ample area for adhesion (e.g., greater than 20% of the area of bottom surface 116). Magnet 150 may be fixed to the bottom surface of tray assembly 104 and/or a surface of base shell 110 (e.g., within sub-cavity 118). In some embodiments, magnet 150 may be incorporated into a charging element (e.g., a charging element having the characteristics of charging element 410 described below). In some embodiments, such a charging element may take the place of magnet 150, and may be incorporated into base assembly 102 (e.g., in a fixed position therein). Such charging element may provide power to item 60 while it is within packaging 10 (e.g., while retained by magnet 150). For example, magnet 150 and the charging element (as separate elements, or as a combined charging element incorporating a magnet) may be positioned in alignment with an intended position for item 60 in packaging 10, and/or an intended position of a receiver coil of item 60, as described further below with respect to charging assembly 40 and packaging assembly 20.a1

In some embodiments, to further provide ample room for magnet 150 while still providing a compact base assembly 102, tray assembly 104 may include an opening 124 within which magnet 150 is partially disposed. See, e.g., opening 124 in tray 120 shown in FIGS. 3-5. In this way, magnet 150 can be positioned closer to item-receiving surface 142, and a smaller magnet may be used than may otherwise be used, since its magnetic field would have less distance to travel to extend above item-receiving surface.

Figure 5:
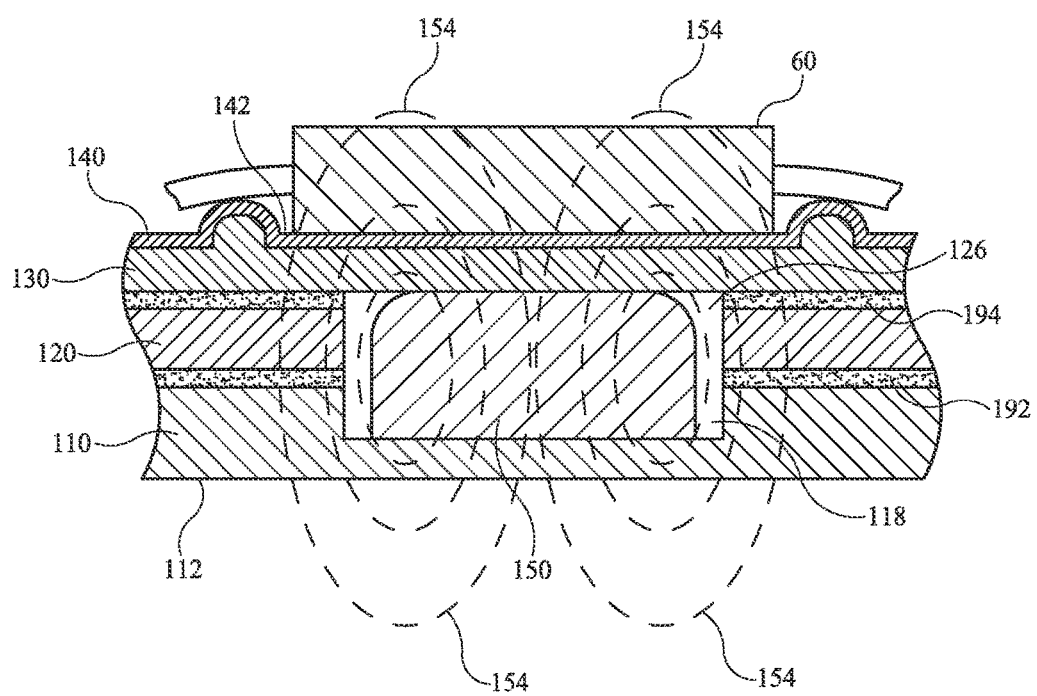
FIG. 5 shows an enlarged cross-sectional view of a portion of a base assembly according to embodiments of the present invention.

Magnet 150 may produce a magnetic field 154 that extends above item-receiving surface 142 (see FIG. 5). In some embodiments, magnet 150 may retain item 60 relative to item-receiving surface 142 by magnetic attraction to item 60. For example, item 60 may include a magnetic material (e.g., a ferromagnetic or ferrimagnetic material, and/or a magnet), and magnetic field 154 of magnet 150 may operate on the magnetic material of item 60 to retain item 60 on item-receiving surface 142 by attracting the magnetic material of item 60 (and thus item 60 itself) toward magnet 150 disposed below item-retaining surface 142. Magnetic field 154 may be strong enough to induce an attractive force between magnet 150 and item 60 strong enough to overcome impact forces and other expected forces incident to transport and handling of package 10 and item 60. For example, item 60 may be retained in position if packaging 10 is dropped from a reasonable height (e.g., less than 3 or 6 feet) or placed upside-down. For example, in some embodiments, magnetic field 154 may be strong enough to induce an attractive force sufficient to independently retain a 200-300 gram object (e.g., a 240 gram object) against the force of gravity (e.g., in a situation where base assembly 102 is turned upside-down while retaining item 60).

Figure 2:
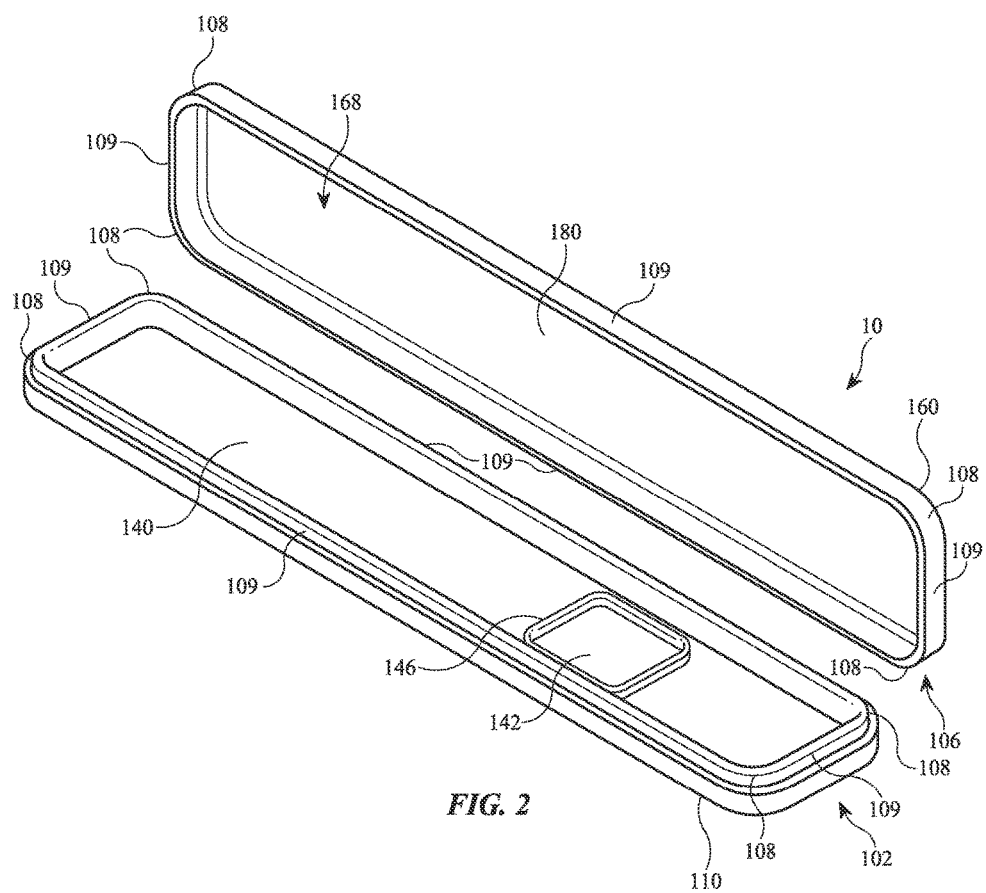
FIG. 2 shows a perspective view of a packaging system according to embodiments of the present invention.

In some embodiments, as shown, for example, in FIGS. 2-4, tray assembly 104 may be formed of several sub-components, such as, for example, tray 120, pillow layer 130, and protective layer 140. Tray 120 may be disposed beneath pillow layer 130 and protective layer 140, and may be in fixed to base shell 110. Tray 120 may be formed of a material having a relatively high hardness (e.g., similar to base shell 110), sufficient to maintain its shape and that of other components of tray assembly 104 that may be relatively softer (e.g., pillow layer 130 and protective layer 140). Tray 120 may be positioned in contact with base shell 110, and may itself define a portion of inner cavity 114 when disposed within base shell 110. The relative hardness and position of tray 120 may also contribute to the structural integrity of packaging 10 by contributing to the strength of base shell 110.

Pillow layer 130 may be fixed to an upper side of tray 120, and may be formed of the same or a softer material than tray 120 (e.g., a relatively soft thermoplastic material (e.g., ABS (acrylonitrile butadiene styrene) or a relatively soft foam material (e.g., silicone foam, EVA (ethylene-vinyl acetate) foam)). Pillow layer 130 may act as a support layer, and may provide support and cushioning for item 60 disposed on item-receiving surface 142 of tray assembly 104, by providing a more yielding substance than that of tray 120 between item 60 and tray 120.

Protective layer 140 may be fixed to an upper side of pillow layer 130 (or may be fixed directly to tray 120 or base shell 110 in embodiments without pillow layer 130 or tray 120, or with a pillow layer that only partially covers the area between tray 120 and protective layer 140). Protective layer 140 may be formed of a softer material than tray 120, and in some embodiments may be formed of a softer material than pillow layer 130 (e.g., a relatively soft thermoplastic material (e.g., ABS (acrylonitrile butadiene styrene) or a relatively soft foam material (e.g., silicone foam, EVA (ethylene-vinyl acetate) foam)). Protective layer 140 may have low propensity to mar (e.g., scratch or discolor) other materials into which it comes into contact. For example, in some embodiments protective layer 140 is formed of a microfiber material. In some embodiments, pillow layer 130 acts as a substrate to protective layer 140, providing a yielding surface upon which protective layer 140 is disposed. In combination with base shell 110 and tray 120, pillow layer 130 and protective layer 140 provide a soft, non-marring, dimensionally-stable item-receiving surface 142.

In some embodiments, item-receiving surface 142 includes surface features to help maintain item 60 in a desired position. As shown, for example, in FIGS. 3 and 4, item-receiving surface 142 may include a raised boundary 146 inset from its perimeter 145. Raised boundary 146 may be given its shape by a corresponding raised boundary 136 inset from a perimeter 135 of pillow layer 130, over which protective layer 140 is formed. Raised boundary 146 may be sized and shaped to correspond to outer portions of item 60, so as to contact or be in close proximity to these outer portions when item 60 is placed within raised boundary 146. This can help maintain the position of item 60 within packaging 10 by helping to inhibit its movement past raised boundary 146. Raised boundary 146 may be positioned anywhere on tray assembly 104. For example, it may be positioned within a middle third of the length of tray assembly 104 in order to accommodate an item 60 having a central portion and bands attached to either side thereof, (such as a watch face with bands on either side) so that the central portion can be maintained within raised boundary 146 and the bands can extend over it to be positioned on other areas of tray assembly 104. Also for example, raised boundary 146 may be positioned in an end third of the length of tray assembly 104 in order to similarly accommodate an item 60 having an end portion with a single band extending from one side, or having a longer band extending from one side and a shorter band extending from the other.

In some embodiments, as shown, for example, in FIGS. 2 and 3, lid assembly 106 may be formed of several sub-components, such as, for example, lid shell 160, pillow layer 170, and protective layer 180. Lid shell 160 may be formed similarly to base shell 110, i.e., of a material having a relatively high hardness compared to internal packaging components, sufficient to maintain its shape and protect internal components of packaging 10 and item 60 contained therein. For example, lid shell 160 may be formed of molded or machined plastic (e.g., polycarbonate) or metal (e.g., aluminum).

In some embodiments, lid shell 160 forms an inner cavity 168, within which pillow layer 170 and protective layer 180 are disposed. In some embodiments, pillow layer 170 and protective layer 180 are fixed to an upper portion of inner cavity 168, so as not to occupy the majority of inner cavity 168. In some embodiments lid assembly 106 is sized and shaped to mate with base assembly 102, such that cavity 114 of base assembly 102 and cavity 168 of lid assembly 106 combine to form a cavity of packaging 10 within which item 60 is retained (see, e.g., FIGS. 2 and 10).

Figure 7:
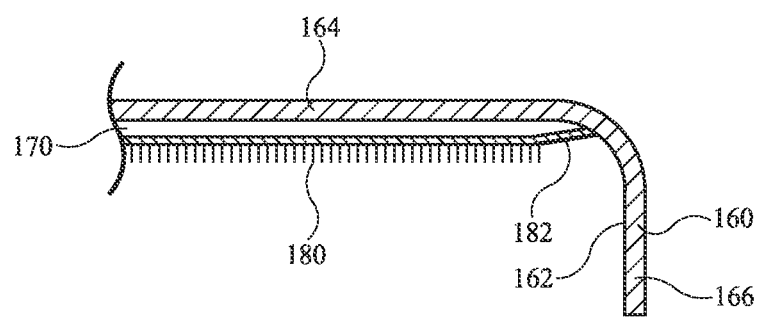
FIG. 7 shows an enlarged cross-sectional view of a portion of a lid assembly according to embodiments of the present invention.

As shown in the cross-sectional view of FIG. 7, pillow layer 170 may be fixed to an inner surface of upper wall 164 of lid shell 160. Pillow layer may be formed of the same or a softer material than lid shell 160 (e.g., a relatively soft thermoplastic material (e.g., ABS (acrylonitrile butadiene styrene) or a relatively soft foam material (e.g., silicone foam, EVA (ethylene-vinyl acetate) foam)).

Protective layer 180 may be fixed to a lower side of pillow layer 170 as shown in FIG. 7 (or may be fixed directly to lid shell 160 in embodiments without pillow layer 170 or with a pillow layer that only partially covers the area between lid shell 160 and protective layer 180). Protective layer 180 may be formed of the same or a softer material than lid shell 160, and in some embodiments may be formed of a softer material than pillow layer 170 (e.g., a relatively soft thermoplastic material (e.g., ABS (acrylonitrile butadiene styrene) or a relatively soft foam material (e.g., silicone foam, EVA (ethylene-vinyl acetate) foam)). Protective layer 180 may have low propensity to mar other materials into which it comes into contact. For example, in some embodiments protective layer 180 is formed of a microfiber material.

When lid assembly 106 is positioned on base assembly 102 such that packaging 10 is in a closed configuration, an inner surface of protective layer 180 may come into contact with item 60. Pillow layer 170 may act as a support layer, and may provide support and cushioning for item 60 disposed on item-receiving surface 142 of tray assembly 104, by providing a more yielding substance than that of lid shell 160 between item 60 and lid shell 160. In some embodiments, pillow layer 170 acts as a substrate to protective layer 180, providing a yielding surface upon which protective layer 180 is disposed. In combination with lid shell 160, pillow layer 170 and protective layer 180 provide a soft, non-marring, dimensionally-stable inner surface for lid assembly 106.

Microfiber material often has a thickness and feel that manifest in an abrupt interface between the microfiber and an uncovered portion of a smooth substrate upon which the microfiber is applied. For example, lid shell 160 may have a smooth inner surface 162 upon which pillow layer 170 and microfiber protective layer 180 are disposed. But some of smooth inner surface 162 may remain uncovered. For example, in some embodiments smooth inner surface 162 is exposed along side walls 166 of lid shell 160, but its upper wall 164 is covered by microfiber protective layer 180. FIG. 7 shows an example configuration.

Figure 6:
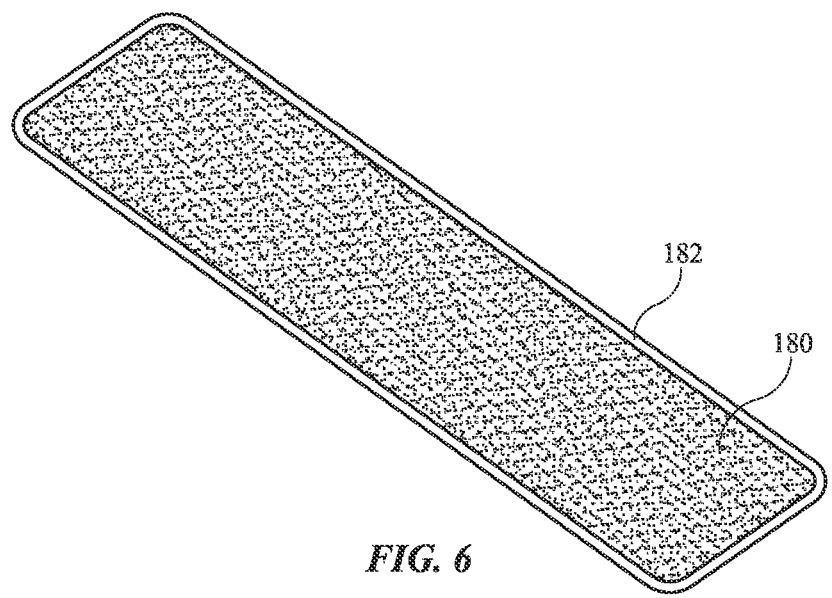
FIG. 6 shows a perspective view of a microfiber layer according to embodiments of the present invention.

In some embodiments, to create a smoother transition from inner surface 162 to microfiber protective layer 180 an outer periphery 182 of microfiber protective layer 180 may be debossed, as shown in FIGS. 6 and 7. Debossed fibers in outer periphery 182 of microfiber protective layer 180 are compressed and therefore present a smoother look and feel, closer to that of the smooth inner surface 162. Debossed outer periphery 182 creates a kind of transition zone between the smooth feel of inner surface 162 and the more tactile feel of microfiber protective layer 180, where the transition zone is more compressed and smoother than the rest of protective layer 180. In some embodiments debossed outer periphery 182 extends in from the outer edge of protective layer 180 by between 1 millimeter and 3 millimeters (e.g., 1.5 millimeters)—substantial enough for a handler to feel a smooth transition.

Various components of lid assembly 106 and base assembly 102 have been discussed above and will be further discussed below. In some embodiments some of these components are described as fixed together. They may be fixed together in any suitable manner as may be recognized by one of skill in the art. In some embodiments they are fixed together using adhesive.

For example, as shown in FIG. 4, a lower surface of tray 120 may be fixed to base shell 110 by adhesive 192. Pillow layer 130 may be fixed to tray 120 by adhesive 194. Protective layer 140 may be similarly fixed to pillow layer 130 by adhesive. Lid shell 160, pillow layer 170, and protective layer 180 may be similarly fixed together by adhesive.

Figure 8:
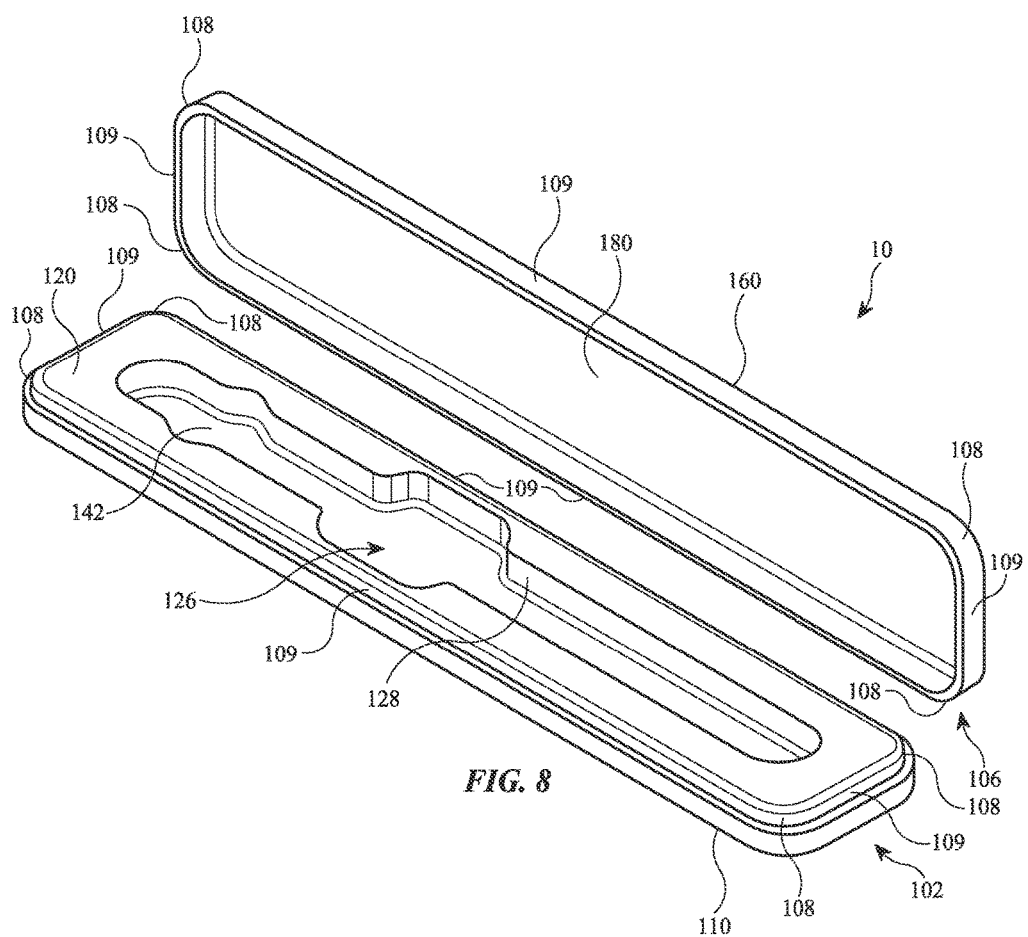
FIG. 8 shows a perspective view of a packaging system according to embodiments of the present invention.

In some embodiments, base assembly 102 may be simplified, and instead of a tray assembly with a tray, pillow layer, and protective layer as described above, it may include tray 120 having a cavity 126 recessed therein, where cavity 126 is formed by a retaining sidewall 128 formed to correspond to the outer profile of item 60, as shown, for example, in FIGS. 8 and 9. Item-receiving surface 142 may form a bottom surface of cavity 126. Retaining sidewall 128 may fit around item 60 closely so as not to allow horizontal motion of item 60 within cavity 126. This may be accomplished by forming retaining sidewall 128 to match the outer profile of item 60. Vertical motion of item 60 may be prevented by lid assembly 106, which, when positioned over base assembly 102 in a closed configuration of packaging 10, may position protective surface 180 thereof above item 60 without enough space for item 60 to move vertically outside the bounds of retaining sidewall 128.

In some embodiments, as shown, for example, in FIGS. 8 and 9, to maintain item 60 in the proper vertical position relative to base shell 110 the portion of tray 120 defining its cavity 126 is raised off of bottom surface 116 of cavity 114 of base shell 110. In some such embodiments, in order to increase structural integrity of base assembly 102, a shim 122 may be disposed between and fixed to tray 120 and base shell 110, to bridge a gap that would otherwise be present between the portion of tray 120 defining its cavity 126 and bottom surface 116 of cavity 114 of base shell 110.

Packaging 10 is well-suited to storing and protecting item 60 not only during shipment and retail handling, but also after its sale to a consumer. Packaging 10 provides a robust, re-usable case and/or dock for item 60 that a consumer may desire in order to protect item 60 and to keep it in optimum condition.

Figure 10:
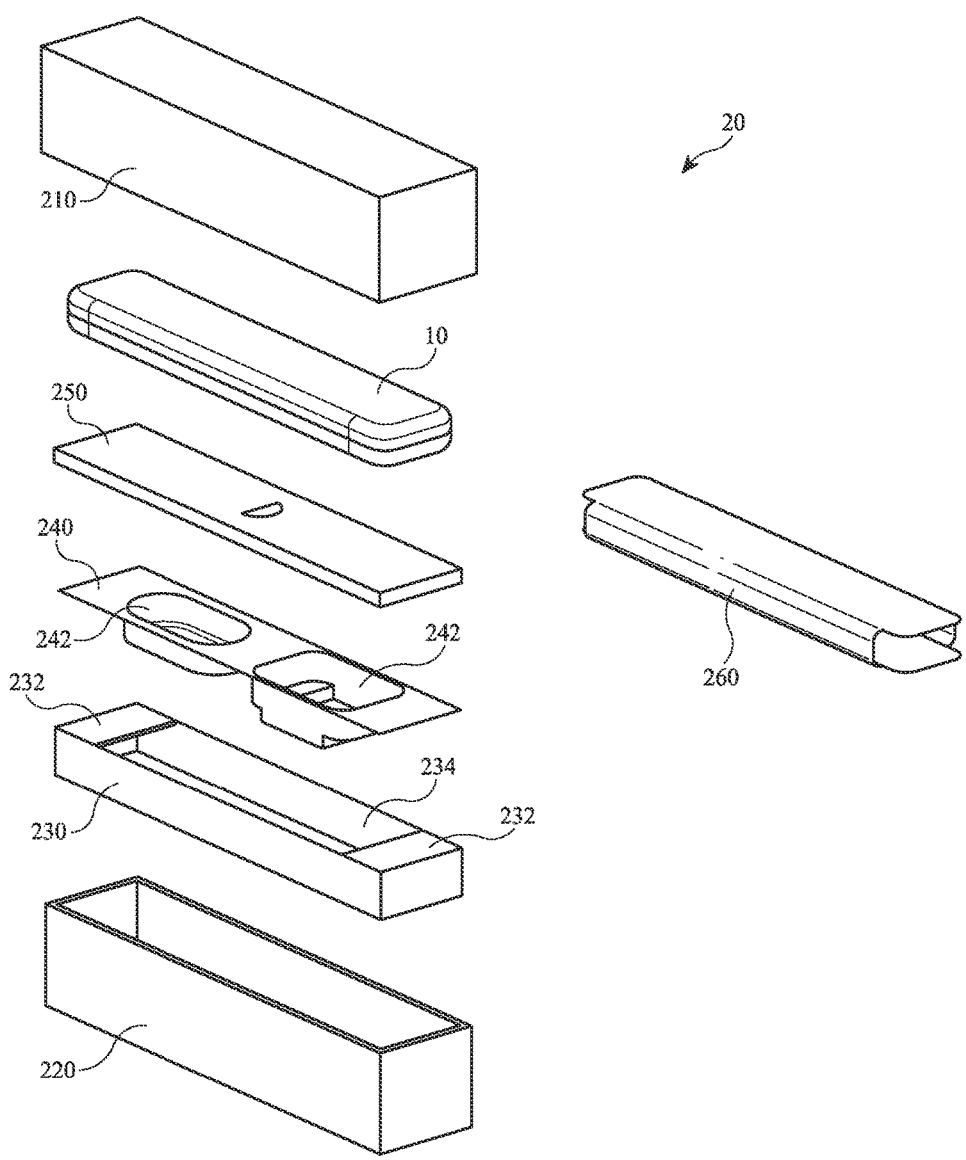
FIG. 10 shows an exploded perspective view of a packaging system according to embodiments of the present invention.

Because packaging 10 may be used as a case after its sale to a consumer, a purveyor may wish to maintain the appearance and integrity of packaging 10 itself, and not to overburden packaging 10 with accessories and documentation that may accompany device 60. To accomplish this, an outer packaging assembly 20 may be used to itself package packaging 10 along with related accessories and documentation. As shown in FIG. 10, outer packaging assembly 20 may include an outer box lid 210, an outer box base 220, a collar 230, an accessory tray 240, a document sleeve 250, and a paper wrap 260.

Outer box lid 210 and outer box base 220 may cover and enclose the rest of packaging assembly 20 and packaging 10. Collar 230 may include support panels 232 and an opening 234 for providing support for accessory tray 240 and providing an area to receive recesses thereof, respectively. Accessory tray 240 may be formed of a molded material to form recesses 242, such as, for example, plastic, or molded fiber. In some embodiments, bottom surfaces of recesses 242 are formed of microfiber, to protect accessories placed therein. Recesses 242 of accessory tray 240 may be used to hold accessories provided with item 60 (e.g., power cable, earphones). Document sleeve 250 may be disposed above accessory tray 240 and enclose documentation provided with item 60. Paper wrap 260 may be wrapped around packaging 10 to protect it from damage (e.g., scratches) during assembly, shipping, and other handling. For example, paper wrap 260 may protect the integrity and legibility of any markings, etchings, or surface treatments that may be formed on the exterior of packaging 10.

FIGS. 11-13 and 15-17 illustrate packaging 30 according to some embodiments of the present invention. Packaging 30 includes a base assembly 302 and a lid assembly 306. Base assembly 302 and lid assembly 306 are separable from each other, and can be coupled together to enclose an inner area, within which item 60 may be stored.

Figure 11:
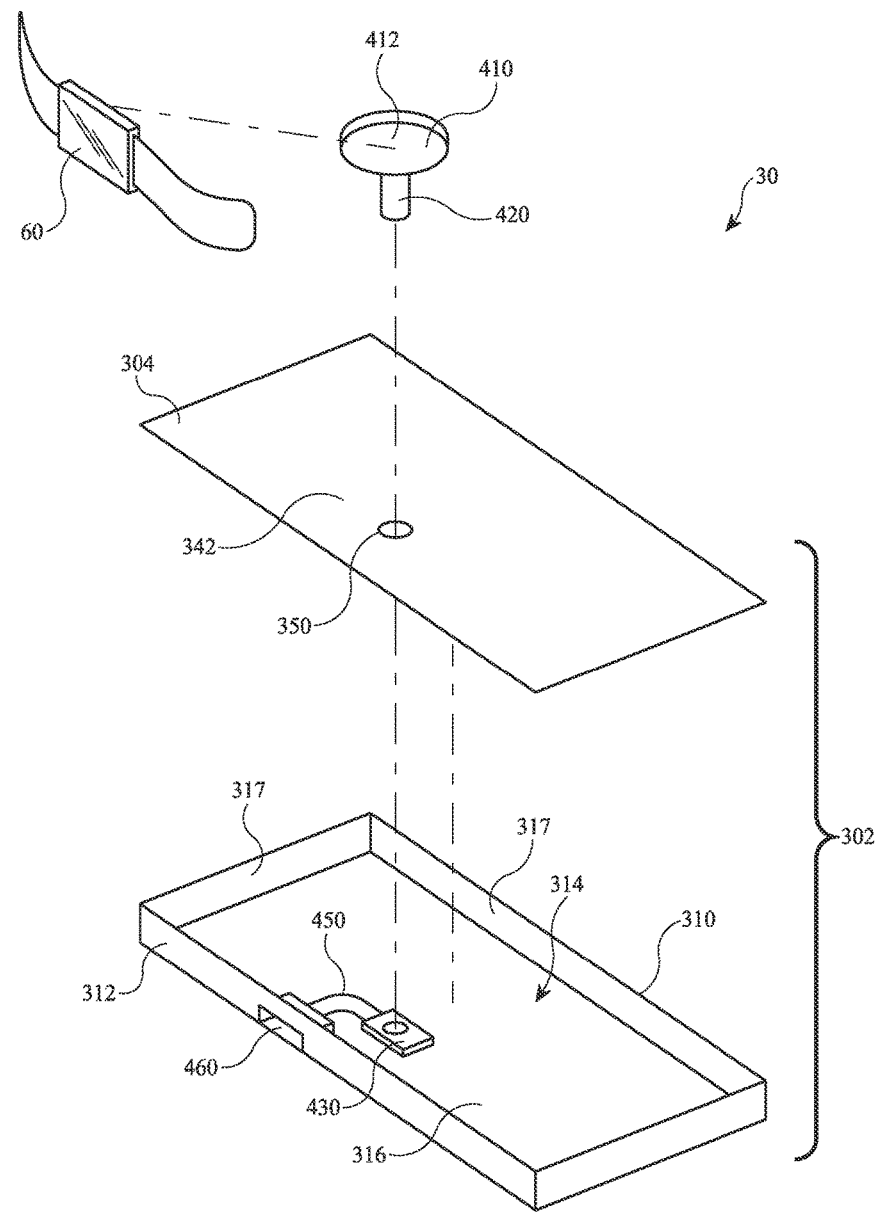
FIG. 11 shows an exploded perspective view of a packaging system according to embodiments of the present invention.
Figure 17:
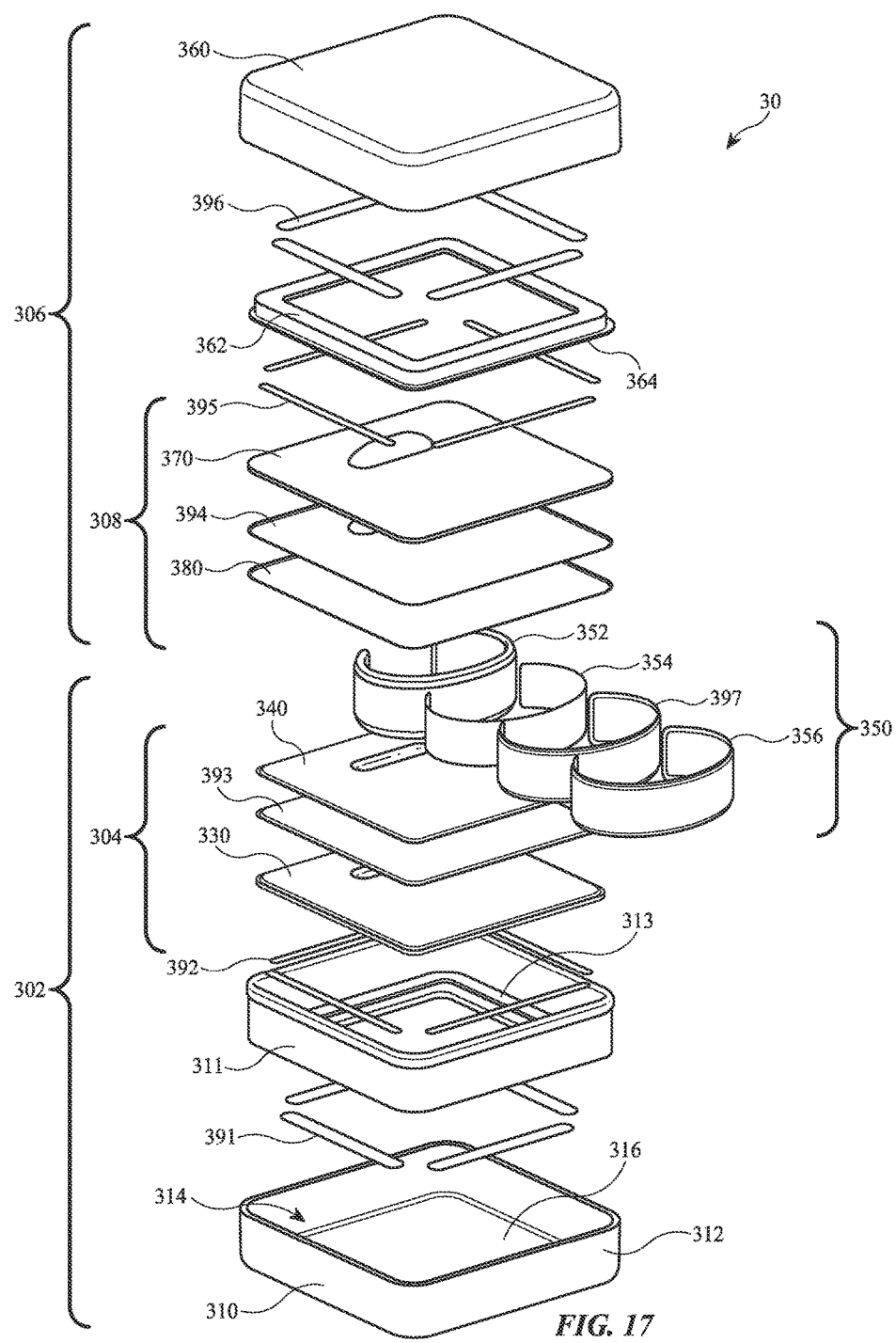
FIG. 17 shows an exploded perspective view of the packaging system of FIG. 15 according to embodiments of the present invention.

FIG. 11 shows base assembly 302 in an exploded view, along with item 60. Base assembly 302 may include a base shell 310, a tray assembly 304, and a charging assembly 40 (see FIG. 14). Tray assembly 304 may be formed from a single tray, as shown in FIG. 11, or an assembly of multiple components as shown in FIG. 17, for example.

Base shell 310 may be formed of a material having a relatively high hardness (e.g., as compared to some internal packaging components as will be described), sufficient to maintain its shape and protect internal components of packaging 30 and item 60 contained therein. For example, base shell 310 may be formed of molded or machined plastic (e.g., polycarbonate) or metal (e.g., aluminum). In some embodiments base shell 310 forms an outer side surface 312 and an inner cavity 314. Cavity 314 may at least partially contain internal components of packaging 30 and item 60.

Tray assembly may include an item-receiving surface 342 upon which item 60 may be retained within packaging 30. Item-receiving surface 342 may be formed of a material having a relatively low hardness (e.g., as compared to base shell 310), to protect item 60, which comes into contact with item-receiving surface 342 when item 60 is stored within packaging 30. For example, item-receiving surface 342 may be formed of a microfiber material.

In some embodiments, tray assembly 304 is received within cavity 314 of base shell 310. In some embodiments outer dimensions of tray assembly 304 match inner dimensions of cavity 314 formed by side surfaces 317 thereof. This dimensional correspondence helps maintain the position of tray assembly 304 relative to base shell 310, which in turn helps maintain the position of item 60.

Figure 12:
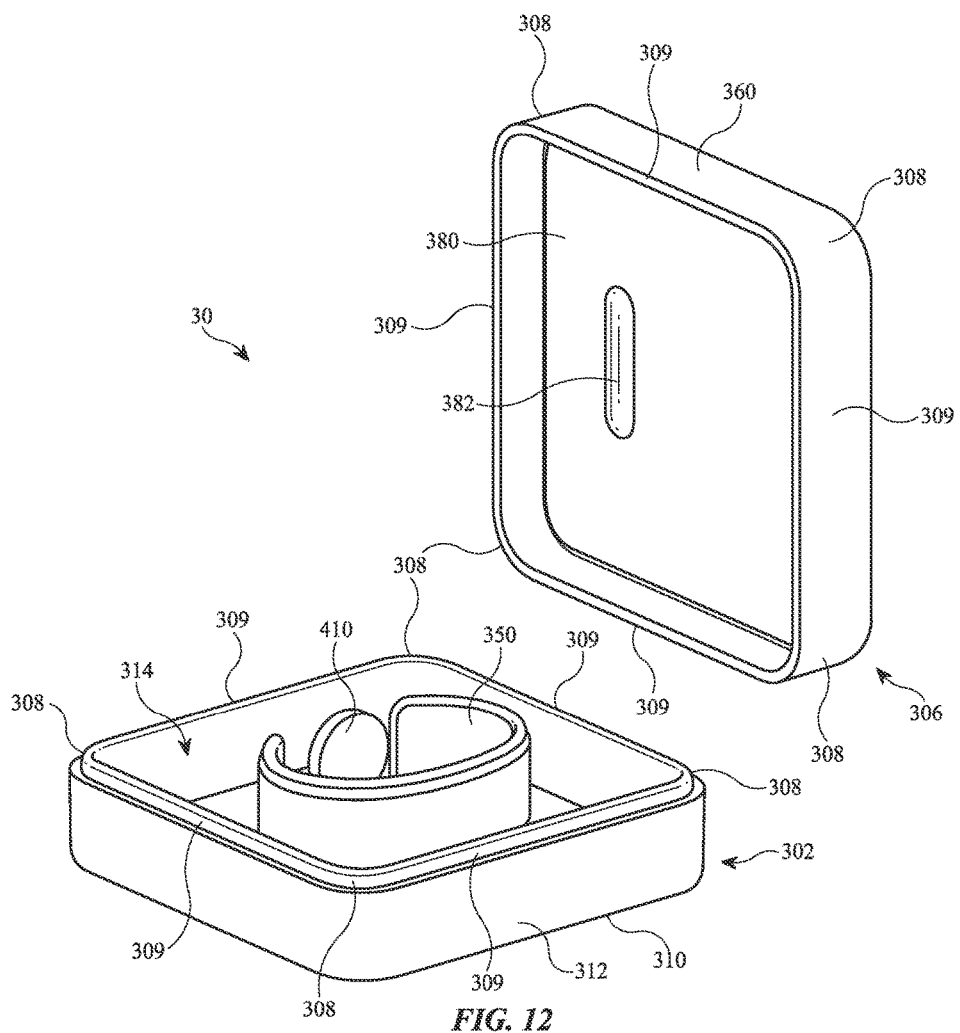
FIG. 12 shows a perspective view of a packaging system according to embodiments of the present invention.
Figure 13:
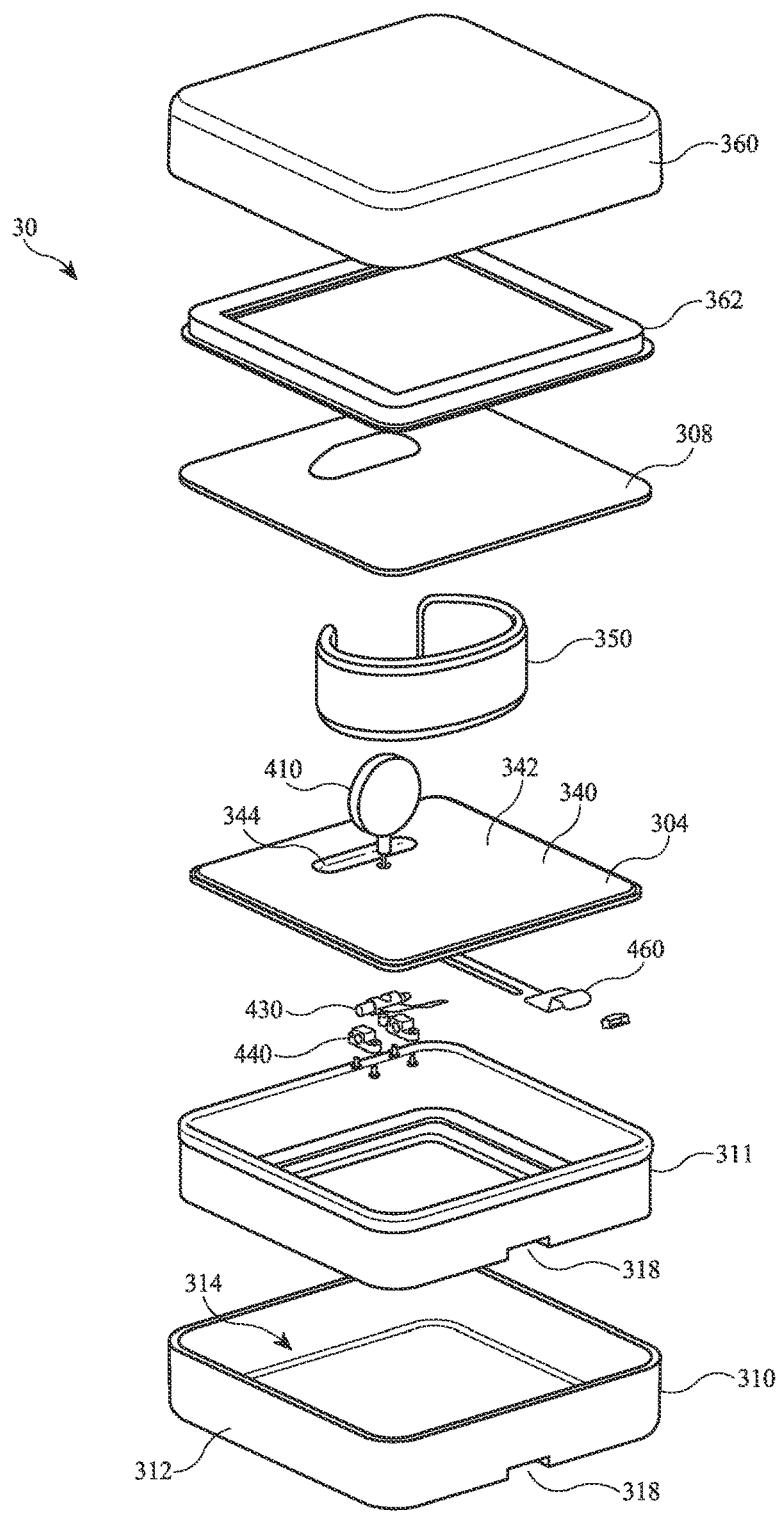
FIG. 13 shows an exploded perspective view of the packaging system of FIG. 12 according to embodiments of the present invention.

In some embodiments, a charging assembly 40 is incorporated into packaging 30, e.g., within base assembly 302 (see, e.g., FIGS. 11-13). But charging assembly 40 may not be included in some embodiments (see, e.g., FIGS. 16 and 17). In embodiments including charging assembly 40, it may be mounted to base assembly 302 (e.g., to base shell 310 via a mount 430) and may include a post 420 that extends up through item-receiving surface 342 to position a charging element 410 coupled to post 420 on or just above item-receiving surface 342, as shown, for example, in FIG. 11. Post 420 is not limited to the cylindrical form shown, but can have any form connecting charging element 410 to other elements or charging assembly 40 or packaging assembly 20.

Charging element 410 may supply power to item 60 (e.g., to a battery or other power-storage element thereof) when item 60 is disposed on item-receiving surface 342. Charging element 410 may be electrically connected to an electrical port 460 accessible through outer side surface 312 of base shell 310. Electrical port 460 may be configured to receive input from a plug configured for any power and/or data standard (e.g., Universal Serial Bus or MagSafe® (owned by Apple Inc.)) and/or one with a bespoke design. In some embodiments, as shown, for example, in FIGS. 12-14, charging element 410 is a circular puck. But the shape of charging element 410 need not be circular or puck-shaped. It can have any suitable shape for coupling to and/or providing power to an item 60. In some embodiments, a charging surface 412 of charging element 410 has a shape corresponding to a surface of item 60. For example, charging element 410 may have a concave charging surface, and item 60 may have a similarly sized and shaped convex surface sized and shaped to be received by concave charging surface 412. Charging element 410 and other components of charging assembly 40 may have the same characteristics as those described with reference to similar components disclosed in U.S. Patent Application Nos. 62/045,470; 62/045,474; 62/045,455; and/or 62/045,457, all filed Sep. 3, 2014. Each of these applications is incorporated herein by reference in its entirety.

Charging element 410 may be connected to electrical port 460 via a wired connection (e.g., via wire 450), which may include at least wires for supplying power (e.g., common and ground) or wires for supplying data. Power or data from a device or resource connected to electrical port 460 may be transferred to charging element 410 via wire 450 and post 420, which may also include wires passing therethrough to carry such power or data.

Figure 14:
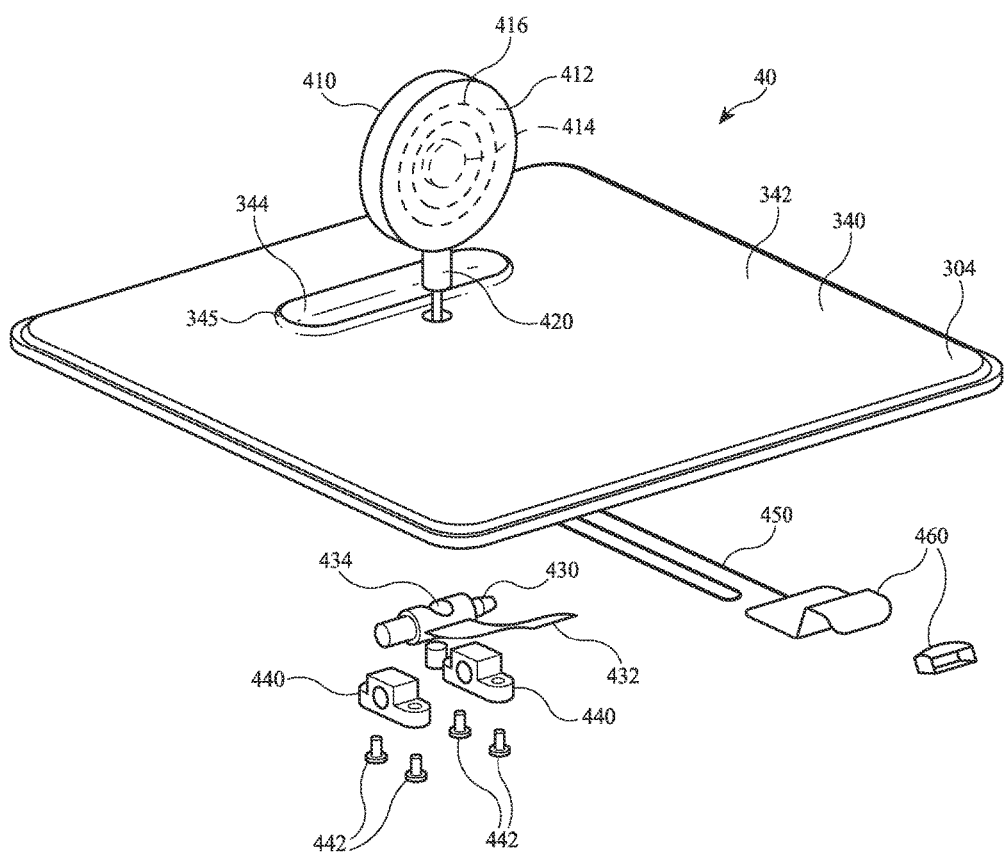
FIG. 14 shows an enlarged perspective view of a charging sub-assembly according to embodiments of the present invention.

FIG. 14 illustrates an exploded view of charging assembly 40 extending through item-receiving surface 342 of tray assembly 304. In some embodiments, charging assembly 40 includes charging element 410, post 420, mount 430, an anchor 440, wire 450, and electrical port 460. In some embodiments, charging element 410 is an inductive charging element having an induction coil 416 disposed therein, and provides power to a device placed in proximity to it via an electromagnetic field, without requiring a wired connection (e.g., by inducing a current in a coil of the device). Inductive charging element 410 may power a device (e.g., item 60) most efficiently when charging element 410 is in a particular position relative to the device. Optimal positioning can help increase charging efficiency, which increases as charging element 410 and a receiver coil of an electronic device (e.g., item 60) become better aligned. In some embodiments, to facilitate optimal positioning of charging element 410 and item 60 to be charged, charging element pivots toward item 60 when item 60 is placed in proximity thereto, such that charging element 410 positions itself in an optimal power-transfer position. Such pivoting may occur about a horizontal axis (e.g., an axis parallel to product-receiving surface 342).

Motion of charging element 410 relative to base assembly 302 (e.g., by pivoting in the manner described) helps maintain charging efficiency among differently-shaped items 60 or different positions of item 60 within packaging 30. In some embodiments, charging element may move in ways other than pivoting as described, alternatively or in addition to such pivoting. For example charging element 410 may rotate about an axis that moves with charging element 410 as it pivots as described above, such as an axis through post 420. In some embodiments charging element may translate along such an axis (e.g., the axis of post 420).

In some embodiments, charging element 410 has a neutral, or default, position in which it is tilted toward a center of item-receiving surface 342, away from an intended location of item 60 (or at least of the portion of item 60 configured to receive power inductively). When a user places item 60 in proximity to charging element 410, charging element 410 tilts toward item 60 to position itself in an optimum (or at least better) position to transfer power to item 60 inductively. For example, charging element 410 may tilt about an axis of mount 430, to which charging element 410 may be coupled via post 420.

The neutral position of charging element 410 may be maintained in the absence of item 60 (or any other item that may apply an outside force on charging element 410) through its support structure, which includes mount 430. Mount 430 may receive post 420 in an opening 434 of mount 430, and may include a leaf spring such as rocker spring 432. Mount 430 is mounted to a substrate of base assembly 302. In some embodiments mount 430 is rotatably mounted to bottom surface 316 of cavity 314 of base shell 310. Mount 430 may be mounted thereto via anchors 440 that confine protrusions of mount 430 to permit rotation of mount 430 relative to anchors 440.

Rocker spring 432 may bias mount 430 in the neutral position. For example, rocker spring 432 may apply a biasing force against any element of base assembly 302 that charging element 410 moves relative to. For example, it may apply a biasing force against a bottom surface of tray assembly 304, as shown in the configuration of FIG. 14. In some embodiments, the biasing force is tuned so as to be overcome by a magnetic force produced by charging element 410 in proximity to item 60. In some embodiments, charging element 410 includes a magnet 414 to produce such magnetic force. The magnetic force of magnet 414 overcomes the biasing force of rocker spring 432 when charging element 410 is in proximity to item 60, thereby causing charging element 410 to rotate (about an axis of mount 430) and tilt toward item 60 into an optimal position to inductively provide power to item 60 (while causing attendant rotation of mount 430 and post 420). In addition to driving charging element 410 to tilt toward and magnetically couple to item 60, the magnetic attraction between charging element 410 and item 60 may help maintain item 60 in position within packaging assembly 20 (e.g., when packaging assembly 20 containing item 60 is handled or stored, such as during shipping or stocking).

In some embodiments, rocker spring 432 is directly fixed to tray assembly 304, and mount 430 acts as a rocker that pushes on the spring when moved away from its neutral position, thereby providing similar biasing force as described above. In such embodiments, post mount 430 may be free from direct attachment to base shell 310 or tray assembly 304, and may not be confined by, for example, anchors 440.

To help a user locate item 60 properly to induce rotation of charging element 410 into its optimal charging position, tray assembly 304 may include a location feature 344. In some embodiments location feature 344 may be a graphic marking to show a user where to place item 60 (e.g., an "X" or a bull's-eye pattern). In some embodiments, as shown in, e.g., FIGS. 13-17, location feature 344 may be a physical indentation in item-receiving surface 342 of tray assembly 304. Indentation 344 may also help maintain the position of item 60 under influence of magnetic force from charging element 410, thereby helping to drive rotation of charging element 410 to the optimal charging position. A corresponding indentation 382 in lid assembly 306 (see FIG. 12) may assist this function. Together, lower indentation 344 and upper indentation 382 may capture opposing sides of item 60 (e.g., opposing sides of a smartwatch face in the case where item 60 is a smartwatch) to securely hold it therebetween.

Lower indentation 344 and upper indentation 382 may have any suitable shape, and may be the same or different shapes. For example, one or both of lower indentation 344 and upper indentation 382 may be in an oval shape, as shown in FIGS. 13-17. In some embodiments, one or both of lower indentation 344 and upper indentation 382 may be ring-shaped to fit the profile of item 60 (e.g., opposing sides of a smartwatch face and band in the case where item 60 is a smartwatch). In some embodiments, one or both of lower indentation 344 and upper indentation 382 may be circular to support the outer sides of item 60 (e.g., outer sides of a smartwatch face and band in the case where item 60 is a smartwatch)

In some embodiments, lower indentation 344 and upper indentation 382 may be asymmetric. That is, one of lower indentation 344 and upper indentation 382 may be deeper or sized differently than the other. For example, in some embodiments lower indentation 344 is deeper than upper indentation 382, to accommodate an asymmetrical feature of item 60 (e.g., a crown or other control knob or button thereof, as where item 60 is a watch). Also for example, in some embodiments upper indentation 382 is deeper than lower indentation 344, to accommodate an asymmetrical feature of item 60 (e.g., a crown or other control knob or button thereof, as where item 60 is a watch). In some embodiments the deeper indentation 344, 382 is a drawn-out version of the shape of the less-deep indentation 344, 382. In some embodiments the deeper indentation 344, 382 has a shape with a sub-indentation therein, to localize depth where it is to accommodate protruding elements of item 60.

In some embodiments (see, e.g., FIG. 14) one or both of indentations 344, 382 may include a ridge 345, 383 built up around the indentation 344, 382, while the surface around the ridge remains lower than the ridge. This can allow indentation 344, 382 to be deeper than the distance from the surrounding surface to the bottom of the indentation, to better retain item 60 while avoiding a reduction in distance between the surfaces surrounding indentations 344, 382 when packaging 30 is closed.

In some embodiments, charging assembly 40 may not include a post (e.g., post 420), and instead charging element 410 itself is directly attached to rotatable mount such as mount 430. In some embodiments, charging element 410 does not rotate with respect to base assembly 302. In such embodiments, charging assembly may not include a post (e.g., post 420), mount (e.g., mount 430). or anchor (e.g., anchor 440), and charging element 410 may be fixed relative to base assembly 102 or 302. For example, charging element 410 may be fixed in a position above item-receiving surface 342 (such as is shown, for example, in FIGS. 12 and 13) by a fastening mechanism, such as, for example, adhesive, a screw, a rivet, a press-fit, or any combination thereof. In some embodiments, charging element 410 may be fixed in a position below an item-receiving surface (e.g., below item-receiving surface 142 or 342). In embodiments where charging element 410 is fixed relative to base assembly 102 or 302, it is fixed in a position in alignment with an intended position for item 60 to be placed within the packaging (e.g., packaging 10 or 20). More specifically, the position of element 410 is fixed in a position in alignment with an intended position of a receiver coil of item 60, to which it can transfer power inductively.

To assemble charging assembly 40 within packaging 30, in some embodiments it is helpful to have some slack in wire 450. For example, in some assembly processes one end of wire 450 (e.g., connected to electrical port 460) is connected to opening 318 within cavity 314 of base assembly 302 while the other end is extended through tray assembly 304 and connected to charging element 410. See FIG. 21, for example. Slack is helpful in order to have the ability to make this connection to opening 318 before seating tray assembly 304 within cavity 314. But it is also helpful to be able to control where wire 450 ends up after tray assembly 304 is seated within cavity 314. Since access to wire 450 is lost while tray assembly 304 is seated within cavity 314, its position cannot be manually controlled.

To control the final position of wire 450 during such "blind assembly," in some embodiments wire 450 includes a spring wire 452 along with other power and/or data wires 454. In some embodiments, power and/or data wires 454 are positioned radially around spring wire 452. In some embodiments wire 450 includes an outer jacket or sheath 456 containing spring wire 452 and data wires 454, as shown, for example, in FIGS. 22 and 23, which show an end, or cross-sectional, view of wire 450. Spring wire 452 may be formed of a high modulus material that does not yield or plastically deform (e.g., spring steel, piano wire, shape memory wire). Spring wire 452 may have a pre-set natural shape (e.g., including one or more loops or coils) that it predictably collapses into in the absence of applied tension (e.g., when stretched out to perform assembly processes). Spring wire 452 may drive collapse of wire 450 into its pre-set natural shape. For example, spring wire 452 may have a natural shape including one or more loops or coils 458 between ends thereof (see, e.g., FIG. 24), and so upon seating of tray assembly 304 into cavity 314, spring wire 452 may control motion of wire 450 to collapse in the same shape, thereby locating wire 450 in a predictable and stable location within cavity 314. In some embodiments, wire 450 may be formed with a pre-set default shape having a coil with only a single turn (see, e.g., FIGS. 24A and 24B, which show wire 450 in isolation), in order to minimize the height of the coil. In some embodiments, outer jacket or sheath 456 may be shaped to conform to the pre-set shape of spring wire 452. In some embodiments, outer jacket or sheath 456 may be formed of a Polytetrafluoroethylene (PTFE) (e.g., Teflon® by DuPont®) to provide stiffness.

In some embodiments, the pre-set shape of wire 450 can be defined by heating outer jacket or sheath 456 above a threshold degree, while wire 450 is held in the desired shape. In such embodiments, the pre-set shape of wire 450 may be controlled by outer jacket or sheath 456, and in such embodiments spring wire 452 may be omitted. In some embodiments, heating may be performed in, for example an oven. In some embodiments, heating may be performed in, for example, a bath, in order to heat more quickly and with greater temperature control than in an oven. For example, wire 450 may be assembled including outer jacket or sheath 456 and power and/or data wires 454. Assembled wire 450 may then be cut to its desired length. Ends of cut wire 450 may then be sealed with glue (e.g., by being dipped into glue). Sealed wire 450 may then be wrapped around a form (e.g., a fixture). Wire 450 wrapped around the form may then be submerged in a heated bath. Wire 450 wrapped around the form may then be submerged in a cooling bath. Heating wire 450 above a certain temperature and then cooling wire 450 below the temperature can cause outer jacket or sheath 456 (and wire 450) to retain the shape it was in when it was heated above the temperature, absent applied tension (thereby defining its pre-set natural shape). Wire 450 may then be removed from the form, and its sealed ends cut off. Wire 450 may then be connected between components, and may be stretched and deformed from its pre-set natural shape (e.g., to reach components that are farther apart during assembly than they will be after assembly). Wire 450 will return to its pre-set natural shape once the tension applied to deform it is removed (e.g., after assembly).

These structures and techniques, including spring wire 452 and/or spring outer jacket or sheath 456) can be used to predictably control the position of a wire in many contexts and for many purposes. For example, as depicted in FIG. 25, it may be desired to keep a wire 450 extending within an electronic device 90 (e.g., connecting internal components 92 and 94) in a stable position to avoid interference with other internal components 96 therein. In such a situation, the natural state of wire 450 can be set (by spring wire 452 and/or spring outer jacket or sheath 456) to extend around those other components 96. FIG. 25 shows an internal representation of electronic device 90. Spring wire 452 and/or spring outer jacket or sheath 456 can be used to make a wire follow any predetermined path 459. Since spring wire 452 and/or spring outer jacket or sheath 456 naturally tends toward its natural position, in many applications it may reduce or eliminate the need for fasteners to keep itself (and the wire containing it) in place.

In some embodiments, packaging 30 also includes a clip assembly 350. Clip assembly 350 can also assist in locating item 60 in a desired location on tray assembly 304. For example, in the case where item 60 is a smartwatch, a band thereof may extend around clip 350. In some embodiments, clip assembly 350 is removable. This can be beneficial since clip 350 may provide optimal support for item 60 during shipping and handling, but an end user may find it easier to re-use packaging 30 without clip assembly 350, and to rely on other features of packaging 30 to retain item 60 (e.g., indentations 344 and 382, or charging element 410). A user may also find it easier to locate item 60 in an optimal position for charging with clip assembly 350 removed.

Portions of packaging 30 that may come into contact with item 60 while item 60 is disposed therein may be formed of a soft, non-marring material, such as microfiber. For example, item-receiving surface 342 may be defined by a protective layer 340 of tray assembly 304, and may be formed of microfiber, and an outer surface of clip assembly 350 may be defined by a protective layer 356, which may be formed of microfiber.

In some embodiments, as shown, for example, in FIG. 17, tray assembly 304 may be formed of several sub-components, such as, for example, pillow layer 330 and protective layer 340. Base shell 310 may be disposed beneath pillow layer 330 and protective layer 340, and pillow layer 330 may be fixed thereto.

In some embodiments, base shell 310 may include a riser 311 that provides a surface 313 to which pillow layer 330 is affixed. Surface 313 may be maintained spaced apart from bottom surface 316 to leave room for lower indentation 344 to extend downward from item-receiving surface 342.

In some embodiments, the relatively high hardness of base shell 310 is sufficient to maintain its shape and that of other components of tray assembly 304 that may be relatively softer (e.g., pillow layer 330 and protective layer 340) contained therein. Tray assembly 304 may be positioned in contact with base shell 304, and may itself define a portion of inner cavity 314 when disposed within base shell 304.

In some embodiments, as shown, for example, in FIG. 17, clip assembly 350 may be formed of several sub-components, such as, for example, clip 352, substrate layer 354, and protective layer 356. Clip 352 may be formed of a relatively hard, resilient material that is resistant to deformation and maintains the shape of clip assembly 350 at ambient temperature. For example, clip assembly 350 may have a C-shape as shown. In some embodiments it may have other shapes, such as a circle or oval. To achieve its final shape, clip 352 may be formed of a thermoformable material (e.g., thermoplastic) that can be heated and formed into its final shape. Example forming processes are described below. The C-shape in the illustrated embodiments provides an outer surface about which a band of item 60 can be disposed (e.g., a watch band), while the opening in the C-shape provides an area for a display housing of item 60 (e.g., a watch). In some embodiments, a rear of item 60 (e.g., rear of a watch) may receive power from charging element 410 through the opening in the C-shape of clip assembly 350.

Substrate layer 354 may be fixed to clip 352. In some embodiments substrate layer 354 is formed of material softer than clip 352, for example ABS thermoplastic, and may act as a support layer, providing support and cushioning as described above with respect to pillow layers 130 and 330. In some embodiments substrate layer 354 is formed of polycarbonate. In some embodiments protective layer 356 is may be formed of the same or a softer material than base shell 310, and in some embodiments may be formed of a softer material than substrate layer 354 (e.g., a relatively soft thermoplastic material (e.g., ABS (acrylonitrile butadiene styrene) or a relatively soft foam material (e.g., silicone foam, EVA (ethylene-vinyl acetate) foam)). Protective layer 356 may have low propensity to mar other materials into which it comes into contact. For example, in some embodiments protective layer 356 is formed of a microfiber material as described above with respect to protective layers 140 and 340. Microfiber protective layer 356 may have a debossed outer periphery (e.g., where microfiber wraps around edges of clip 352, or where microfiber from one side of clip 352 meets microfiber from the other side of clip 352). This debossing may be uneven, in that the inner side of the periphery is debossed more (i.e., deeper) than the outer side of the periphery. This can help maintain a consistent edge of the clip assembly 350 during its forming process (described below).

In some embodiments the entire outer surface of clip assembly 350 may be formed of protective layer 356 (e.g., microfiber), for example surrounding substrate layer 354 (e.g., laminated thereto). In such embodiments clip 352 may be omitted.

In some embodiments, clip assembly 350 is assembled in a flat state and then thermoformed around a mold to its final shape. For example, flat clip assembly 350 may be heated and then drawn over a form 710 (e.g., a mandrel-shaped form).

Figure 26:
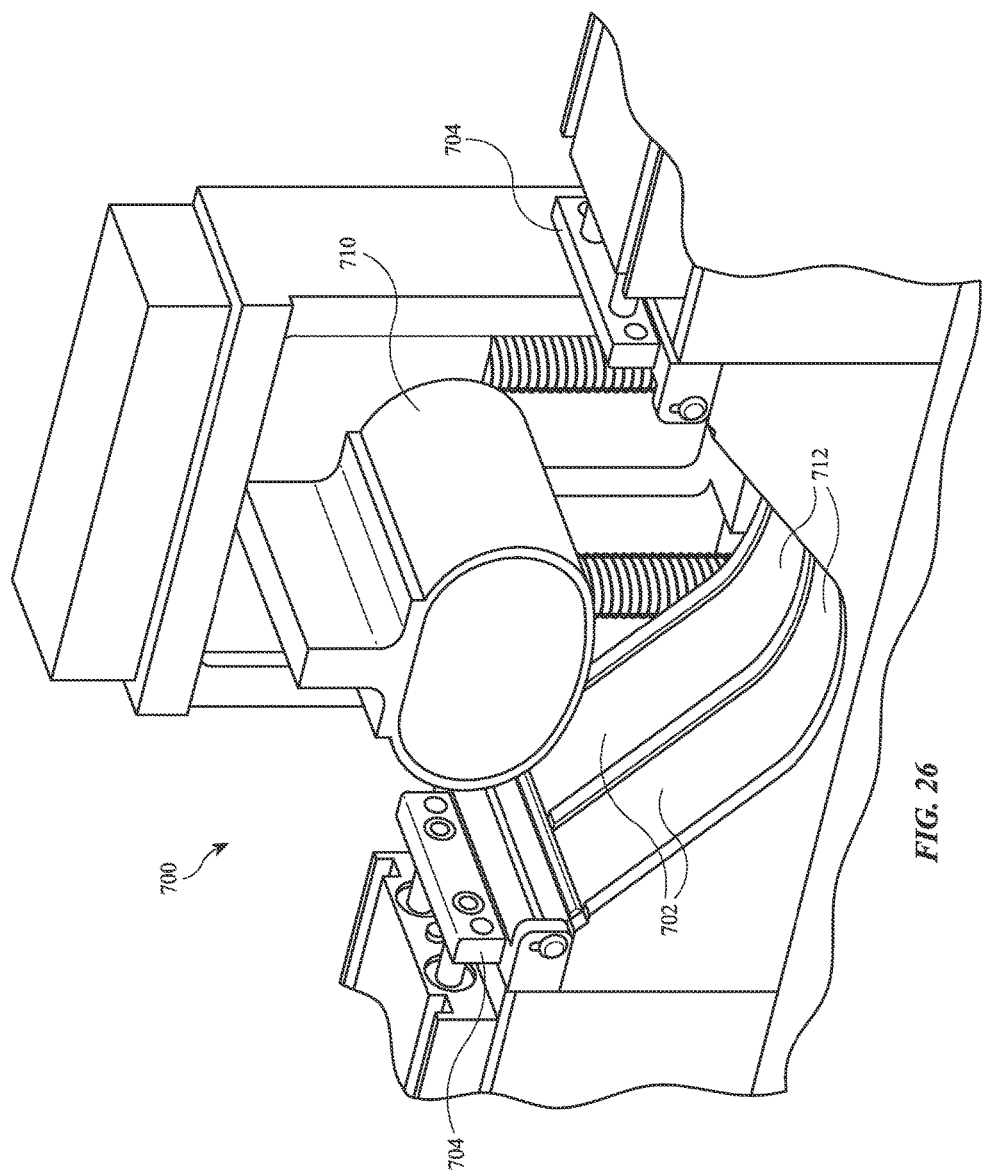
FIG. 26 shows an assembly operation for a clip assembly according to embodiments of the present invention.

FIGS. 26-32 illustrate an example of this process. FIG. 26 shows a clip forming mechanism 700 having multiple clip troughs 702. Carrier strips 712 are positioned within clip troughs 702, and are connected at their ends to actuators 704. In some embodiments, clip assembly 350 is heated (e.g., in an oven, such as, for example, a conveyor belt oven) to bring its temperature above a point at which its materials will be pliable or plastically deformable. In some embodiments, clip assembly 350 may be thermoplastic or contain thermoplastic layers. In some embodiments, the temperature of clip assembly 350 is brought above the point at which its materials (e.g., thermoplastics) will be pliable or plastically deformable (e.g., above its glass transition temperature or that of its thermoplastic components), but below a point that could introduce cosmetic or other flaws into clip assembly 350. For example, in some embodiments, clip assembly 350 is heated to a surface temperature of 120 degrees Celsius (C) (+/−10 degrees C.). Temperature is controlled to make clip assembly 350 sufficiently pliable to accept a new shape, but to avoid temperatures that are too hot, at which surfaces of clip assembly 350 may singe or discolor, and edges may deform and become wavy or otherwise inconsistent. To achieve a suitable temperature range, an oven temperature may be set at 220 degrees Celsius (C) (+/−5 degrees C.) to achieve a conveyor convective air outlet temperature of 180 degrees C. (+/−5 degrees C.), and clip assembly 350 may be maintained within the oven for 60 seconds (+/−5 seconds) (e.g., travelling along a conveyor belt of the oven for 60 seconds).

Figure 27:
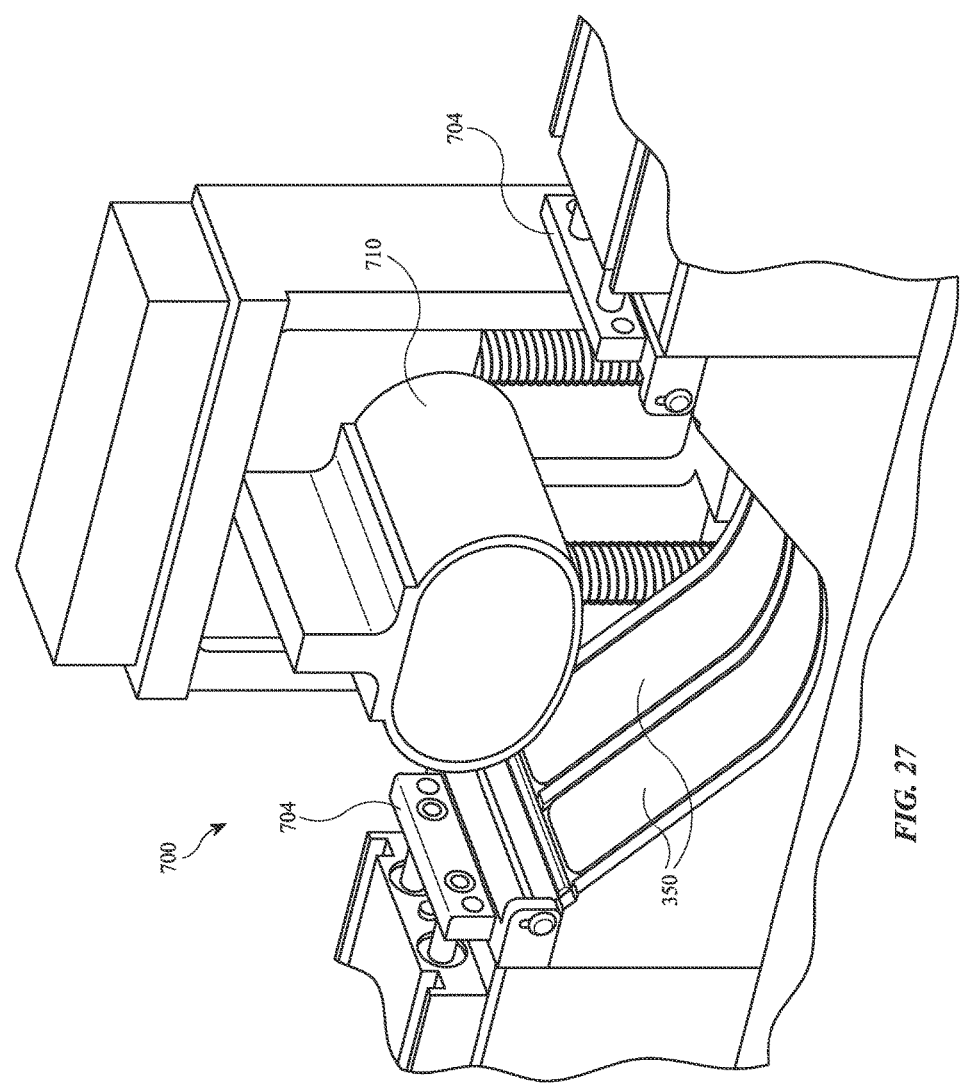
FIG. 27 shows an assembly operation for a clip assembly according to embodiments of the present invention.

As shown in FIG. 27, heated clip assembly 350 may then be disposed beneath form 710 in trough 702, and may follow the shape of trough 702. Clip assembly 350 may be placed in trough 702 so that its more-deeply-debossed side faces upward. This orientation will help minimize waviness that may otherwise be introduced into the peripheral edges of clip assembly 350 by the forming process, since deformation forces will be introduced to the edge primarily from one side. Trough 702 may be formed with a curved bottom at its center (e.g., in a V- or U-shape, curved in the length direction of the trough) and may have a length and width equal to that of clip assembly 350, which can help locate clip assembly 350 centered in trough 702, with the center of clip assembly 350 positioned directly below the center of form 710. This will help the final clip assembly 350 be symmetrical in shape.

Figure 28:
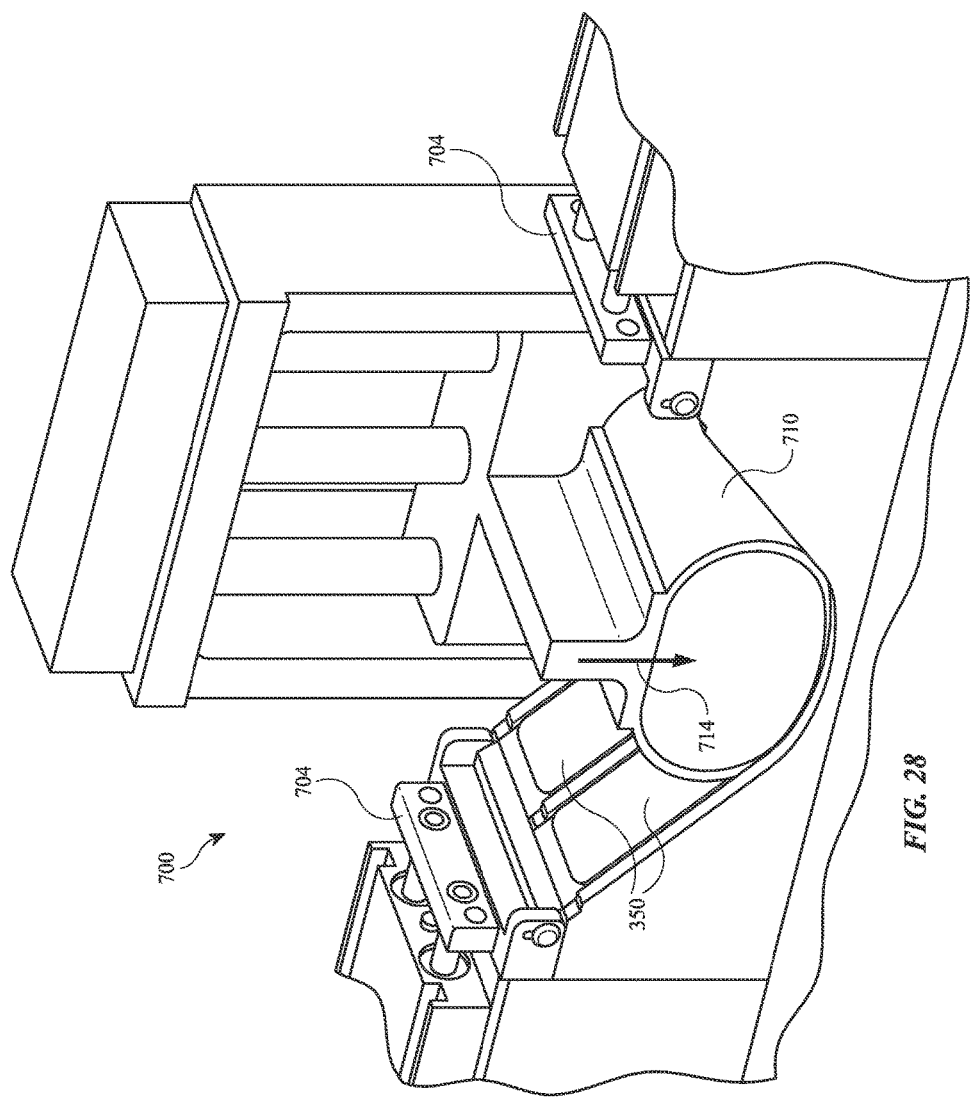
FIG. 28 shows an assembly operation for a clip assembly according to embodiments of the present invention.
Figure 29:
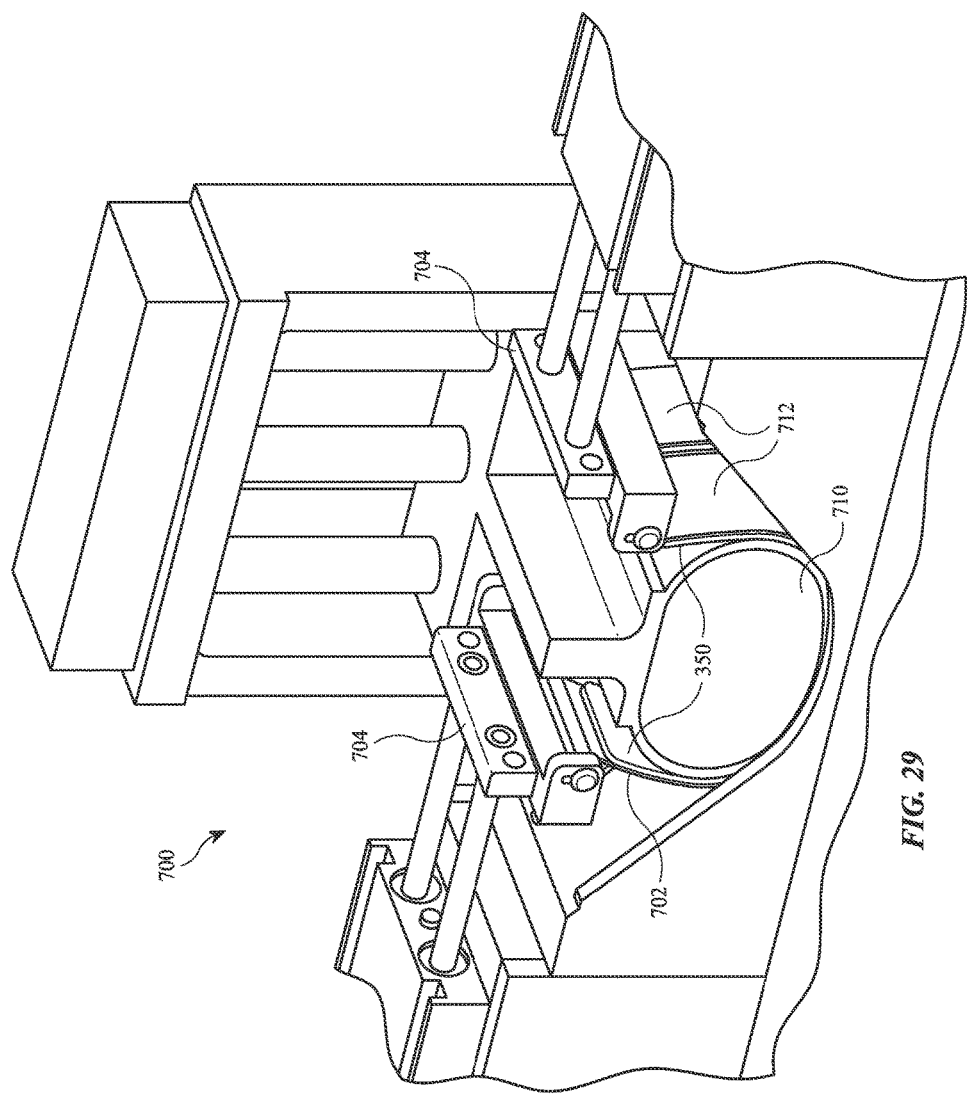
FIG. 29 shows an assembly operation for a clip assembly according to embodiments of the present invention.
Figure 30:
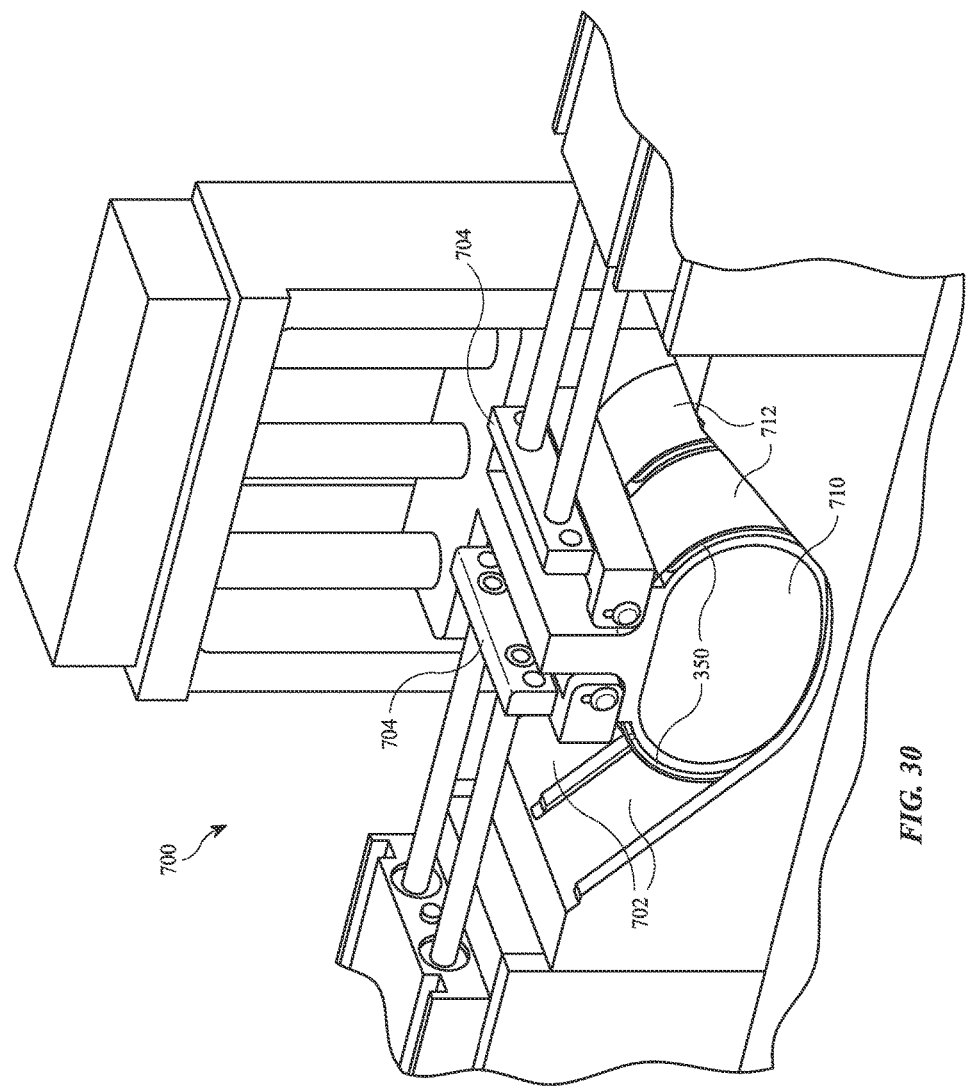
FIG. 30 shows an assembly operation for a clip assembly according to embodiments of the present invention.
Figure 31:
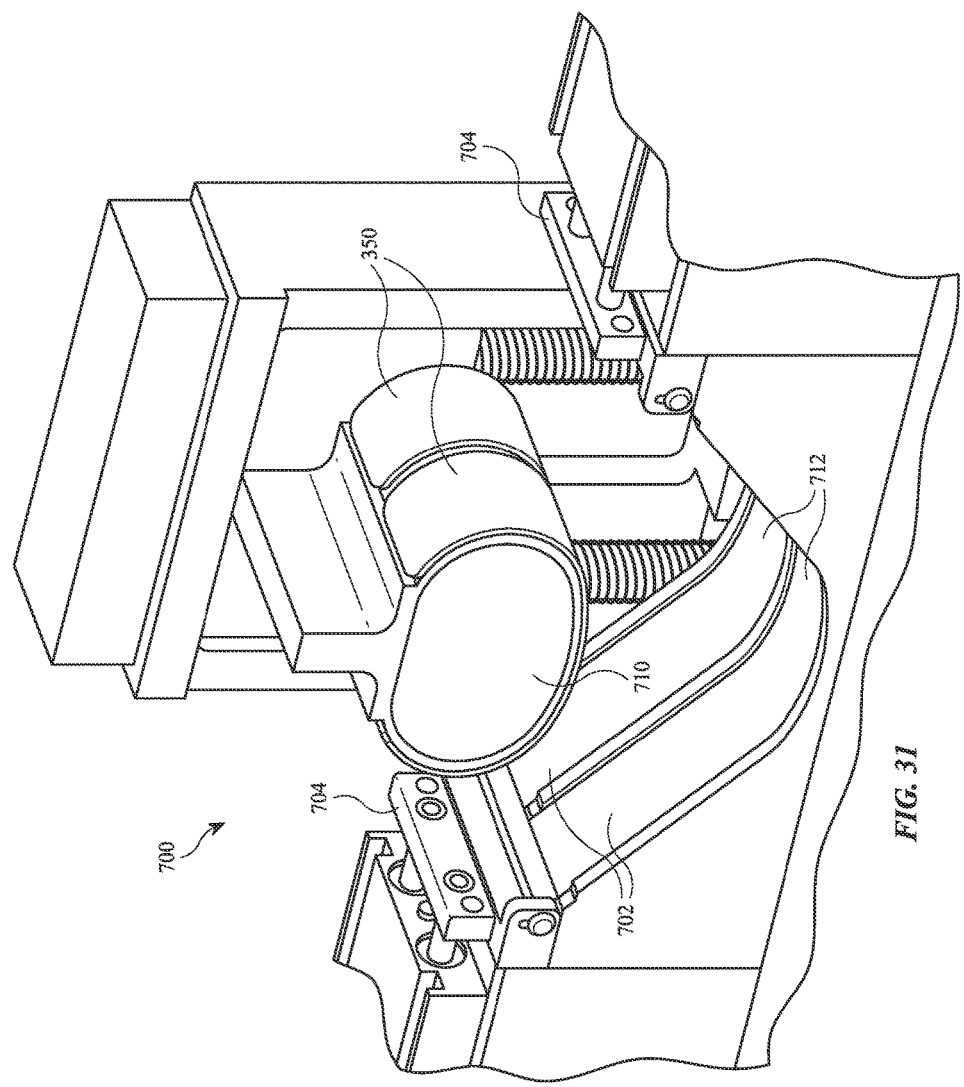
FIG. 31 shows an assembly operation for a clip assembly according to embodiments of the present invention.

Clip assembly 350 may be supported on the side opposite form 710 by carrier strip 712. Carrier strip 712 may be formed of a flexible material having high strength and thermal stability, such as, for example, stainless steel (or, in some embodiments, a plastic film). Clip assembly 350 and form 710 may then be brought into contact (e.g., form 710 may be lowered onto clip assembly 350 in the direction of arrow 714 as shown in FIG. 28). Still in its heated state clip assembly 350 may then be evenly drawn around form 710 from both ends by carrier 712, as shown in FIG. 29. For example, actuators 704 can be actuated to move inward toward form 710, drawing carrier strips 712 and carried clip assembly 350 around form 710 through the connection of carrier strips 712 to actuators 704, as shown in FIG. 29. Actuators 704 may fully extend to fully wrap clip assembly 350 around form 710, as shown in FIG. 30. Actuators 704 may remain extended in this way to hold clip assembly 350 around form 710 until clip assembly 350 is cooled sufficiently to hold its shape on its own (e.g., for 20-30 seconds, allowing clip assembly 350 to cool sufficiently to cause it to solidify and retain its new shape (e.g., below its glass transition temperature or that of its thermoplastic components)). Cooling may be promoted by passing air or other fluid over clip assemblies 350 (e.g., by fans blowing air) to promote convective heat transfer away from clip assemblies 350.

Figure 32:
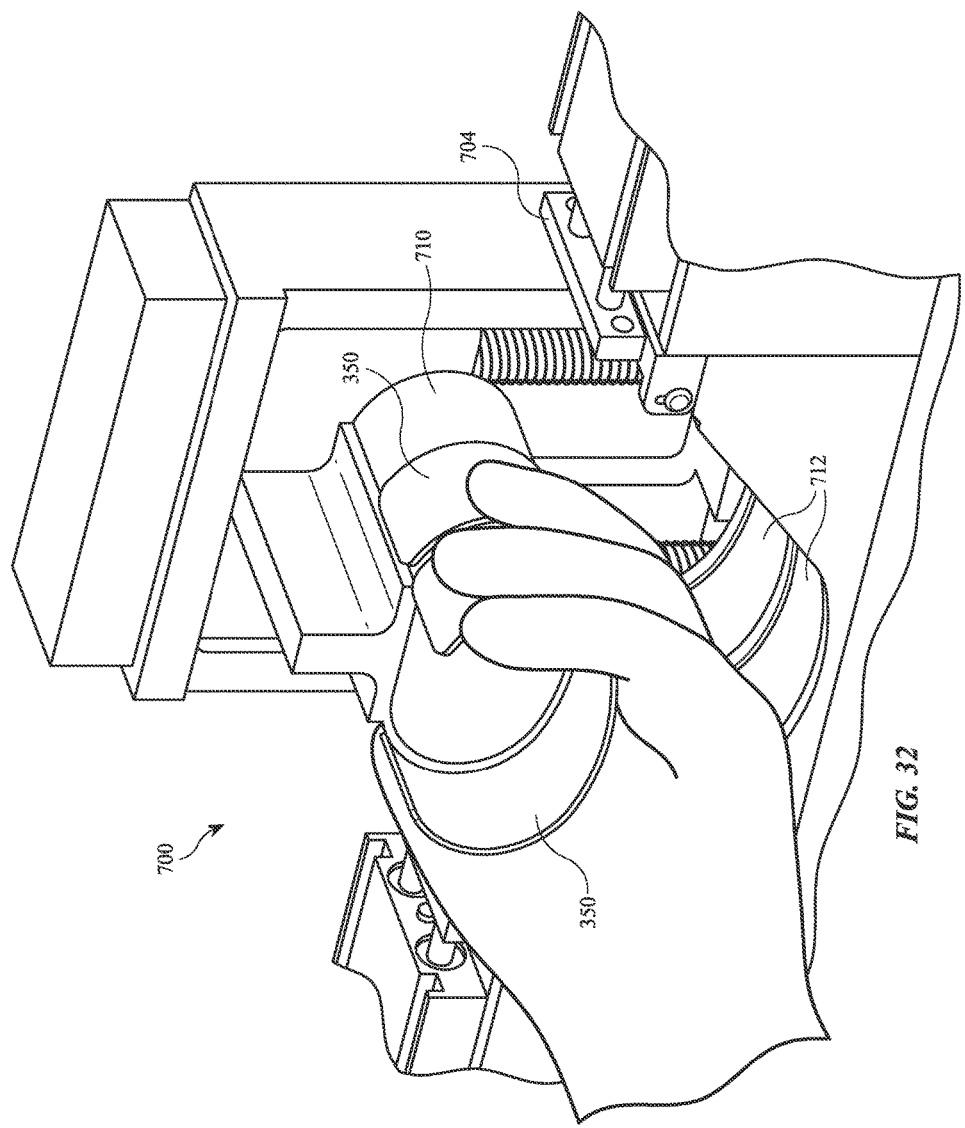
FIG. 32 shows an assembly operation for a clip assembly according to embodiments of the present invention.

After clip assembly 350 is cooled, actuators 704 may retract, thereby releasing clip assembly 350 from carrier strip 712. Form 710, with clip assemblies 350 still wrapped around it, may be raised away from troughs 702 (see FIG. 31), and clip assemblies 350 may be removed from form 710 by, for example, being slid off from its front side, as shown in FIG. 32. To facilitate such forming and removal, form 710 may be connected to the rest of clip forming mechanism 700 by only its rear side, and may have no obstruction from its forming surface to its front side, so that there is nothing obstructing the removal of clip assemblies 350.

The easy insertion and centered location within troughs 702, as well as the easy removal from form 710, as described above, makes the clip assembly formation processes described herein suitable to simultaneous formation of multiple clip assemblies in a fast and efficient manner, suitable for consistent manufacturability on a mass production scale. The careful temperature control and even application of forming forces helps maintain consistent shape and colorfastness of clip assemblies 350, while avoiding damage or defect (cosmetic or otherwise) in the material of clip assembly 350, particularly its microfiber protective layer 356.

Figure 33:
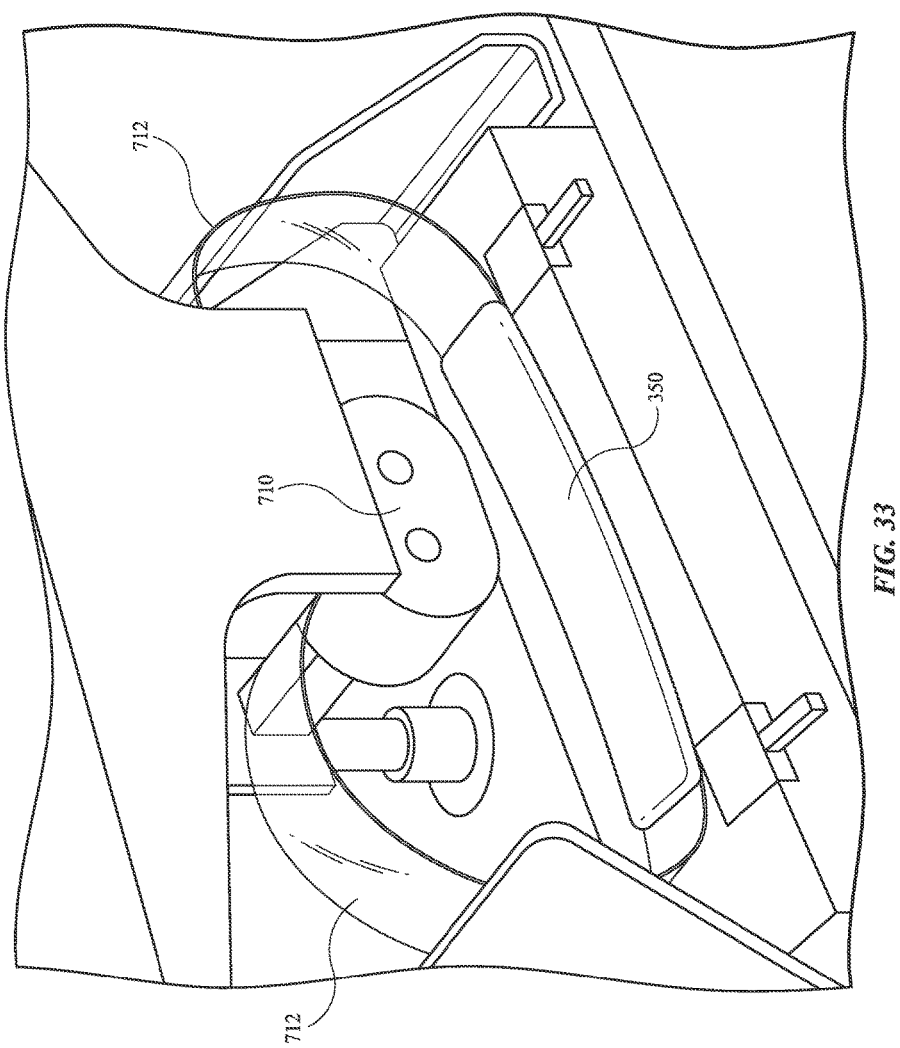
FIG. 33 shows an assembly operation for a clip assembly according to embodiments of the present invention.
Figure 34:
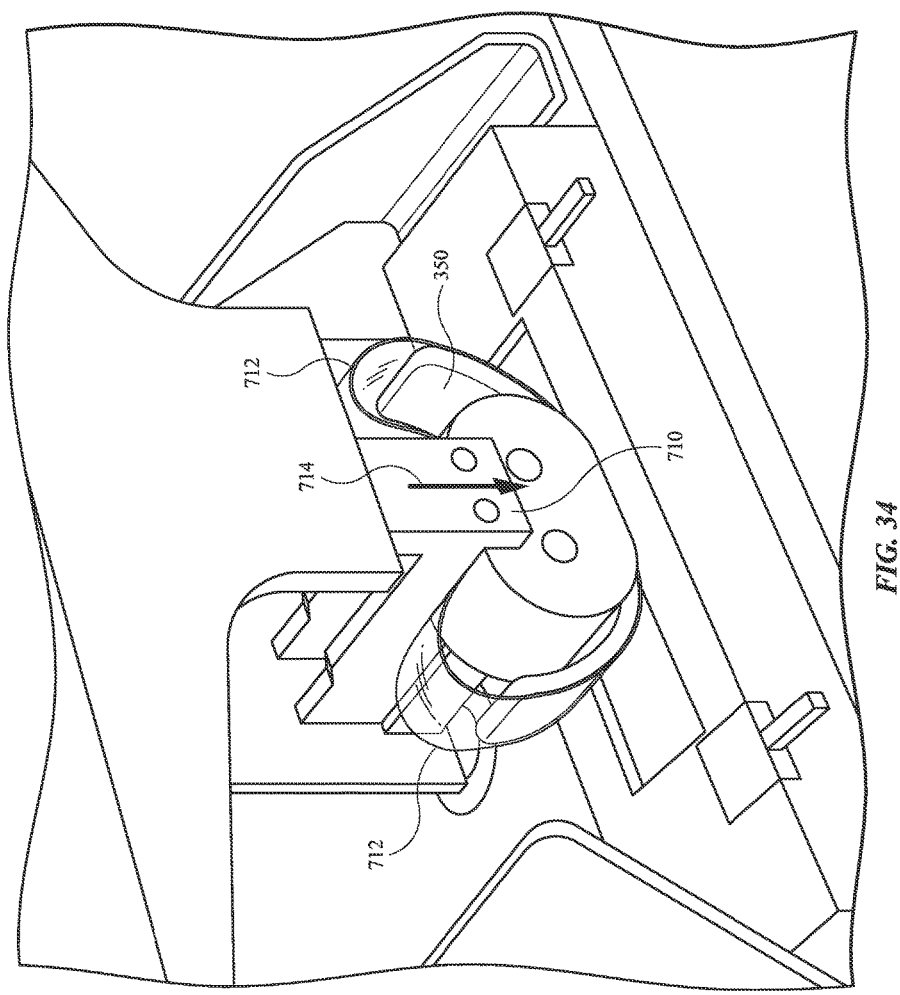
FIG. 34 shows an assembly operation for a clip assembly according to embodiments of the present invention.
Figure 35:
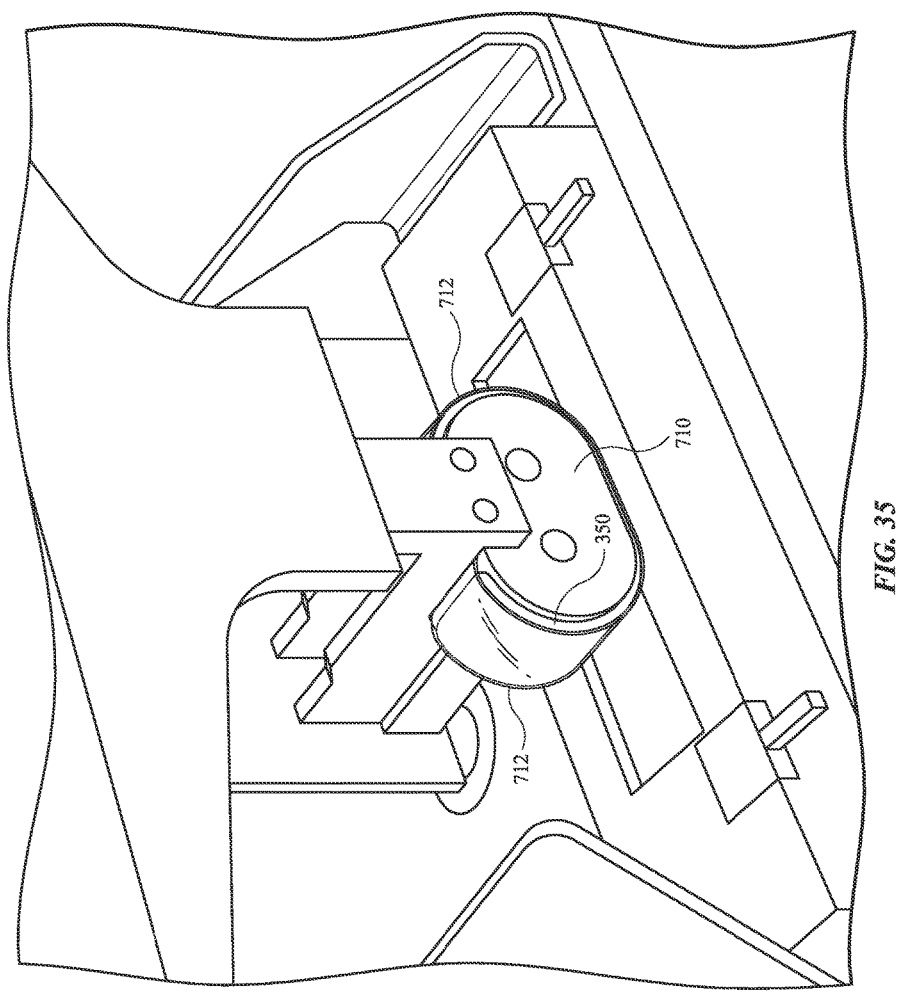
FIG. 35 shows an assembly operation for a clip assembly according to embodiments of the present invention.

FIGS. 33-35 illustrate another example of this process. In some embodiments, clip assembly 350 is heated (e.g., in an oven) to bring its temperature above a point at which its materials will be pliable or plastically deformable. As shown in FIG. 33, flat clip assembly 350 may then be disposed beneath form 710 in its heated state. It may be supported on the side opposite form 710 by a carrier 712. Clip assembly 350 and form 710 may then be brought into contact (e.g., form 710 may be lowered onto clip assembly 350 in the direction of arrow 714 as shown in FIG. 34). Still in its heated state clip assembly 350 may then be drawn around form 710 by carrier 712, as shown in FIGS. 34 and 35. For example, forces can be applied to ends of carrier 712 to draw carrier 712 (and clip assembly 350) around form 710, as shown in FIG. 35. Clip assembly 350 may then be allowed to cool, which can cause it to solidify and retain its new shape.

In some embodiments, as shown, for example, in FIG. 17, lid assembly 306 may be formed of several sub-components, such as, for example, lid shell 360, pillow layer 370, and protective layer 380. Lid shell 360 may be formed similarly to base shell 310 and lid shell 260 described above, i.e., of a material having a relatively high hardness compared to internal packaging components, sufficient to maintain its shape and protect internal components of packaging 30 and item 60 contained therein. For example, lid shell 360 may be formed of molded or machined plastic (e.g., polycarbonate) or metal (e.g., aluminum).

In some embodiments, lid shell 360 forms an inner cavity within which pillow layer 370 and protective layer 380 are disposed. In some embodiments, pillow layer 370 and protective layer 380 are fixed to an upper portion of the inner cavity of lid shell 360, so as not to occupy the majority of the inner cavity. In some embodiments lid shell 360 includes a riser 362 that provides a surface 364 to which pillow layer 370 is affixed. Surface 364 may be maintained spaced apart from an upper interior surface of lid shell 360 to leave room for upper indentation 382 to extend upward from protective layer 380.

Figure 15:
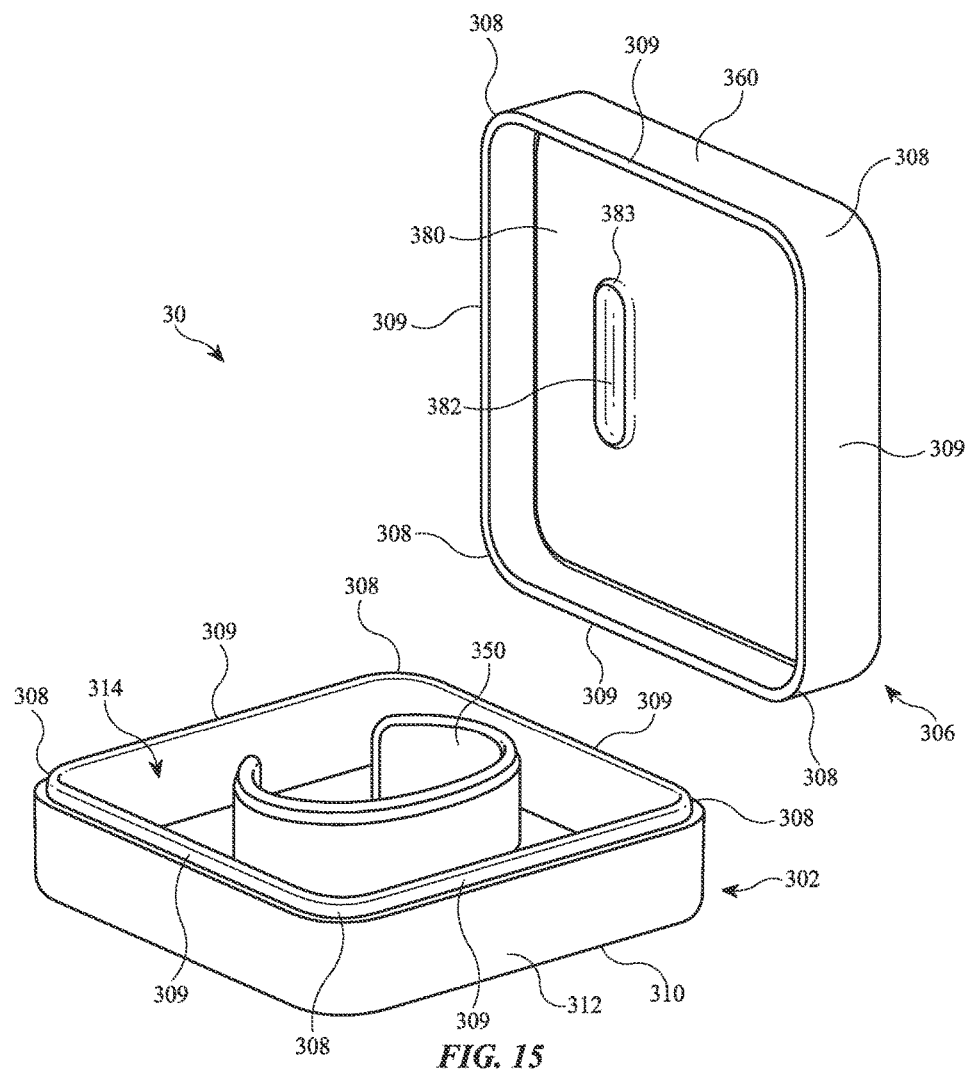
FIG. 15 shows a perspective view of a packaging system according to embodiments of the present invention.
Figure 16:
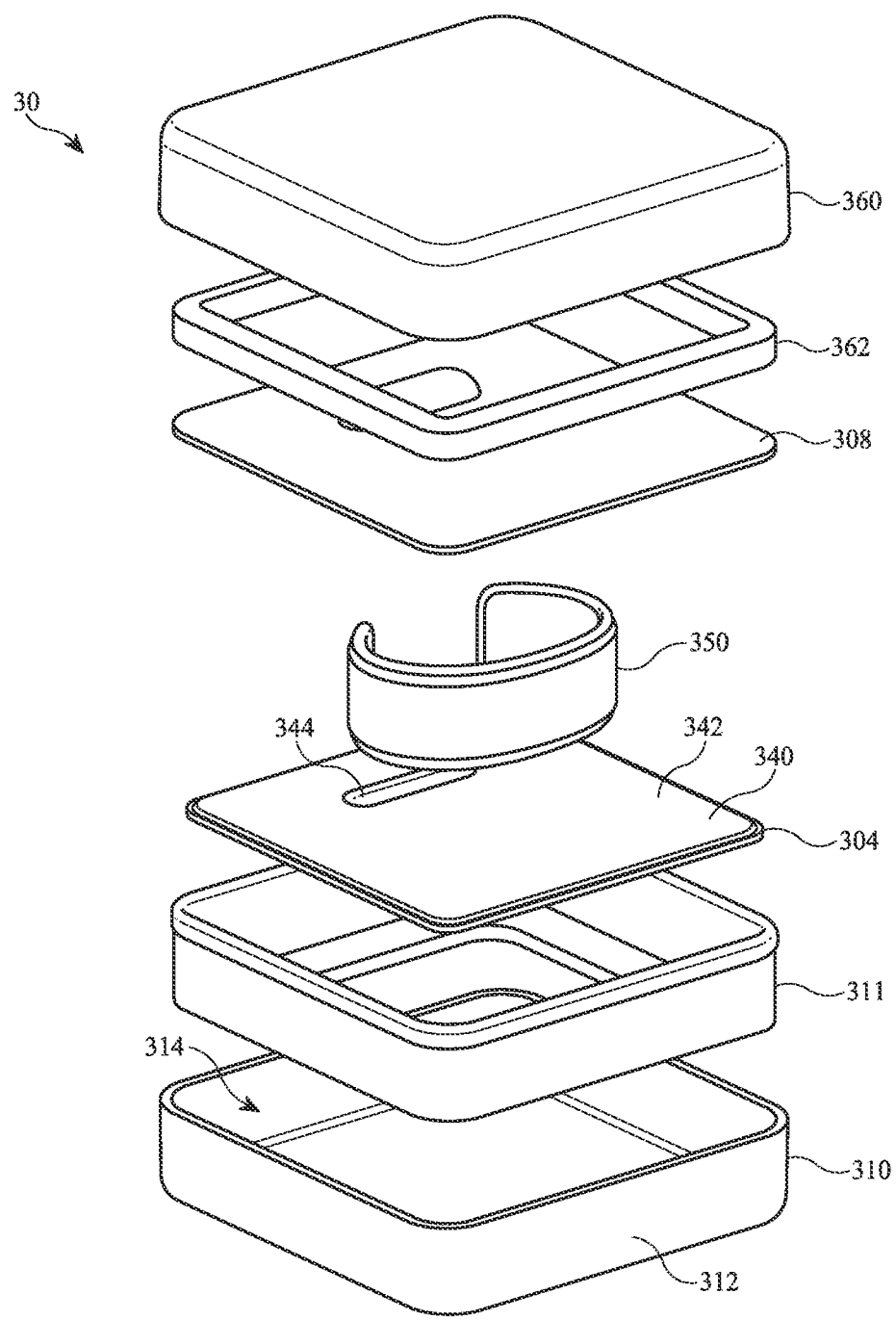
FIG. 16 shows an exploded perspective view of the packaging system of FIG. 15 according to embodiments of the present invention.
Figure 18:
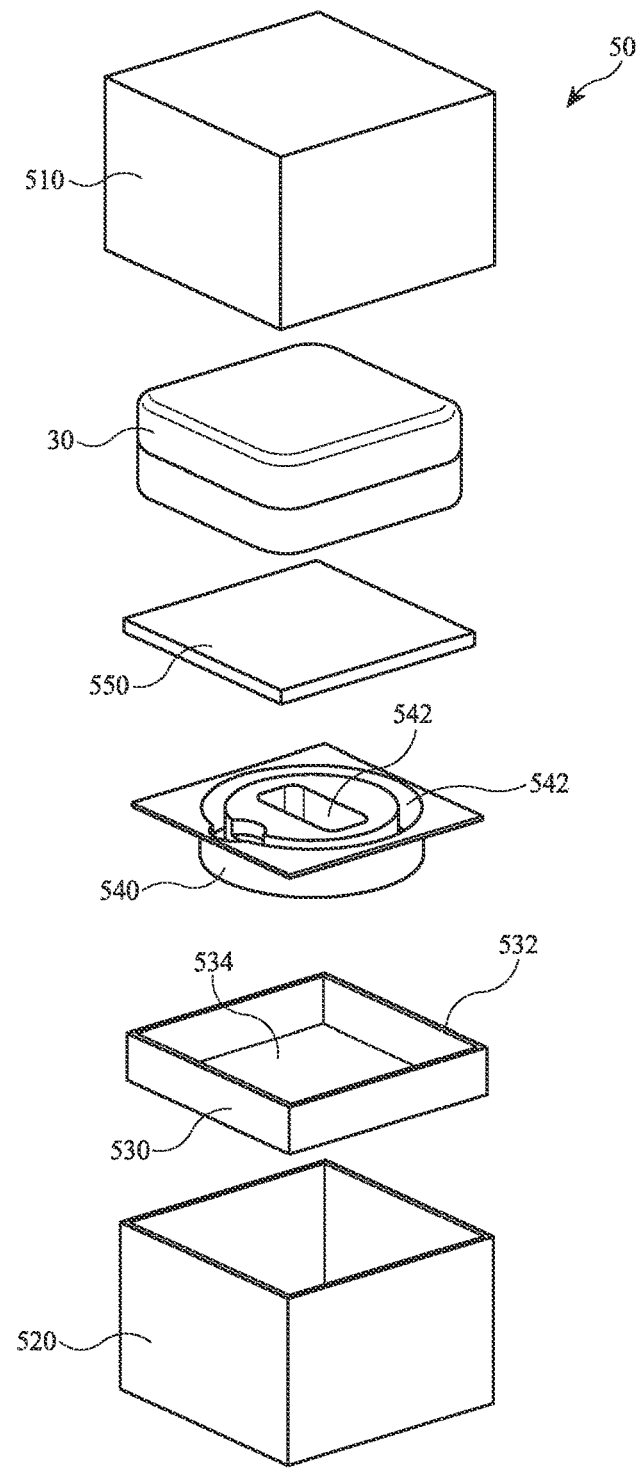
FIG. 18 shows an exploded perspective view of a packaging system according to embodiments of the present invention.

In some embodiments lid assembly 306 is sized and shaped to mate with base assembly 302, such that cavity 314 of base assembly 302 and the cavity of lid assembly 306 combine to form a cavity of packaging 30 within which item 60 is retained (see, e.g., FIGS. 15 and 18).

Pillow layer 370 may be fixed to an inner surface of lid shell 360, similarly as described above with reference to pillow layer 170 and FIG. 7. Pillow layer may be formed of the same or a softer material than lid shell 360 (e.g., a relatively soft thermoplastic material (e.g., ABS (acrylonitrile butadiene styrene) or a relatively soft foam material (e.g., silicone foam, EVA (ethylene-vinyl acetate) foam)).

Protective layer 380 may be fixed to a lower side of pillow layer 370 (or may be fixed directly to lid shell 360 in embodiments without pillow layer 370 or with a pillow layer that only partially covers the area between lid shell 360 and protective layer 380). Protective layer 380 may be formed of a softer material than lid shell 360, and in some embodiments may be formed of a softer material than pillow layer 370 (e.g., a relatively soft thermoplastic material (e.g., ABS (acrylonitrile butadiene styrene) or a relatively soft foam material (e.g., silicone foam, EVA (ethylene-vinyl acetate) foam)). Protective layer 380 may have low propensity to mar other materials into which it comes into contact. For example, in some embodiments protective layer 380 is formed of a microfiber material.

When lid assembly 306 is positioned on base assembly 302 such that packaging 30 is in a closed configuration, an inner surface of protective layer 380 may come into contact with item 60. Pillow layer 370 may act as a support layer, and may provide support and cushioning for item 60 disposed on item-receiving surface 342 of tray assembly 304 by providing a more yielding substance than that of lid shell 360 between item 60 and lid shell 360. In some embodiments, pillow layer 370 acts as a substrate to protective layer 380, providing a yielding surface upon which protective layer 380 is disposed. In combination with lid shell 360, pillow layer 370 and protective layer 380 provide a soft, non-marring, dimensionally-stable inner surface for lid assembly 306.

Various components of lid assembly 306, clip assembly 350, and base assembly 302 have been discussed above and will be further discussed below. In some embodiments some of these components are described as fixed together. They may be fixed together in any suitable manner as may be recognized by one of skill in the art. In some embodiments they are fixed together using adhesive.

For example, as shown in FIG. 17, a lower surface of riser 311 may be fixed to an interior of base shell 310 by adhesive 391. Pillow layer 330 may be fixed to riser 311 by adhesive 392. Protective layer 340 may be fixed to pillow layer 330 by adhesive 393. Clip substrate 354 may be fixed to clip 352 by adhesive. Protective layer 356 of clip assembly 350 may be fixed to clip substrate by adhesive 397. Riser 364 may be fixed to an interior of lid shell 360 by adhesive 396. Pillow layer 370 of lid assembly 306 may be fixed to riser 364 by adhesive 395. Protective layer 380 may be fixed to pillow layer 370 by adhesive 394. Adhesives described herein may be, for example, thermoplastic adhesives.

Packaging 30 is well-suited to storing and protecting item 60 not only during shipment and retail handling, but also after its sale to a consumer. Packaging 30 provides a robust, re-usable case and/or dock for item 60 that a consumer may desire in order to protect item 60 and to keep it in optimum condition. Further, in embodiments including charging assembly 40, packaging 30 becomes a re-usable charging station for item 60 to help a user conveniently recharge a battery of item 60.

Because packaging 30 may be used as a case after its sale to a consumer, a purveyor may wish to maintain the appearance and integrity of packaging 30 itself, and not to overburden packaging 30 with accessories and documentation that may accompany device 60. To accomplish this, an outer packaging assembly 50 may be used to itself package packaging 30 along with related accessories and documentation. As shown in FIG. 18, outer packaging assembly 50 may include an outer box lid 510, an outer box base 520, a collar 530, an accessory tray 540, and a document sleeve 550. Outer packaging assembly 50 may also include a paper wrap similar to paper wrap 260 of FIG. 10.

Outer box lid 510 and outer box base 520 may cover and enclose the rest of packaging assembly 50 and packaging 30. Collar 530 may include support ridge 532 and an opening 534 for providing support for accessory tray 540 and providing an area to receive recesses thereof, respectively. Accessory tray 540 may be formed of a molded material to form recesses 542, such as, for example, plastic, or molded fiber. Recesses 542 of accessory tray 540 may be used to hold accessories provided with item 60 (e.g., power cable, earphones). In some embodiments, bottom surfaces of recesses 542 are formed of microfiber, to protect accessories placed therein. Document sleeve 550 may be disposed above accessory tray 540 and enclose documentation provided with item 60. Paper wrap may be wrapped around packaging 30 to protect it from damage (e.g., scratches) during assembly, shipping, and other handling.

Figure 19:
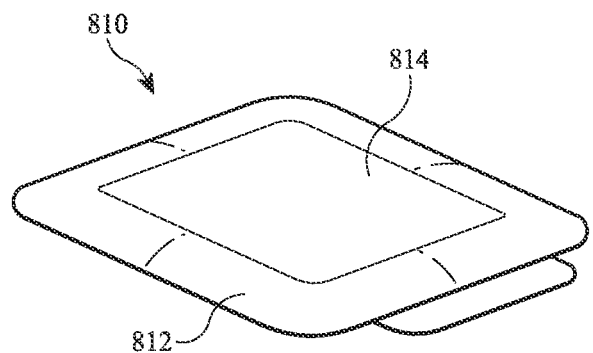
FIG. 19 shows a perspective view of a protective cover according to embodiments of the present invention.
Figure 20:
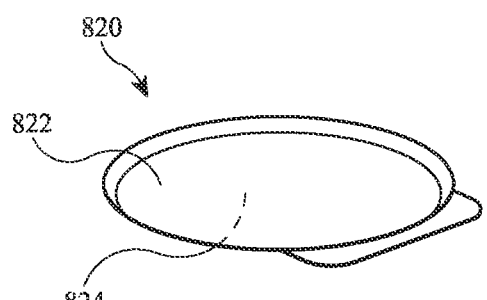
FIG. 20 shows a perspective view of a protective cover according to embodiments of the present invention.

Some embodiments of the present invention include item covers to protect certain areas of item 60. For example, FIG. 19 shows a protective item face cover 810, and FIG. 20 shows a protective item rear cover 820. Either or both of item face cover 810 and item rear cover 820 can be used with either of packaging 10 or 30, with any other type of packaging, or independently of packaging. Item face cover 810 may be disposed on and covering a face of item 60 (e.g., the face of a watch in the event item 60 is a watch, including a smartwatch) to protect the face. Item rear cover 820 may be disposed on and covering a rear surface of item 60 (e.g., the rear surface of a watch in the event item 60 is a watch, including a smartwatch) to protect the rear surface. Item face cover 810 and item rear cover 820 may be removable by a user, and may be disposable, such that they are intended to protect their respective surfaces during shipment and handling, but are intended to be removed and disposed of by an end user.

Item covers 810 and 820 may be compression molded, and may have three-dimensional form and detail. Item covers 810 and 820 may be formed of a relatively yielding material, such as, for example, silicon, and may have a protective cover layer formed of, for example, a polyester material such as Mylar®, a spray-coated silicon, or both (e.g., a spray-coated silicon over a polyester material). For example, item face cover 810 may have a contact surface 812 for contacting and covering the face of item 60, and item rear cover 820 may have a contact surface 822 for contacting and covering the rear of item 60. Contact surfaces 812 and 822 may each have a non-flat shape, e.g., a three-dimensional curvature to correspond to a curvature of the shape of item 60. In some embodiments, in order to appropriately mate with a convex-curved surface of item 60, contact surface 812 or 822 may have a concave curve. In some embodiments, contact surfaces 812 and 822 may have non-continuous curvatures, so as to define distinct and separate curvatures thereof (e.g., two areas of concave curvature that are not tangential at a joining edge thereof). Due to the compression-molded shape of item covers 810 and 820, contact surfaces 812 and 822 may maintain their shapes (e.g., concave curved) in the absence of any applied force.

In some embodiments, the thickness of item covers 810 and 820 varies. For example, the distance between contact surfaces 812 and 822 and opposing respective outer surfaces 814 and 824 may be different at different points on contact surfaces 812 and 822. For example, this distance may be greater near centers of item covers 810 and 820 (in order to provide greater protection and cushioning at centers of protected areas of item 60), and may taper to a lesser distance toward peripheral edges of item covers 810 and 820.

In some embodiments, packaging 10 or packaging 30 may include markings or etchings on an exterior surface thereof (e.g., laser etching). In some embodiments, exterior surfaces of base shells 110 and 310 and/or lid shells 160 and 360 10 may have surface treatments applied, such as, for example, painting or anodizing, or may be wrapped in an outer material, such as, for example, microfiber or leather.

Figure 36:
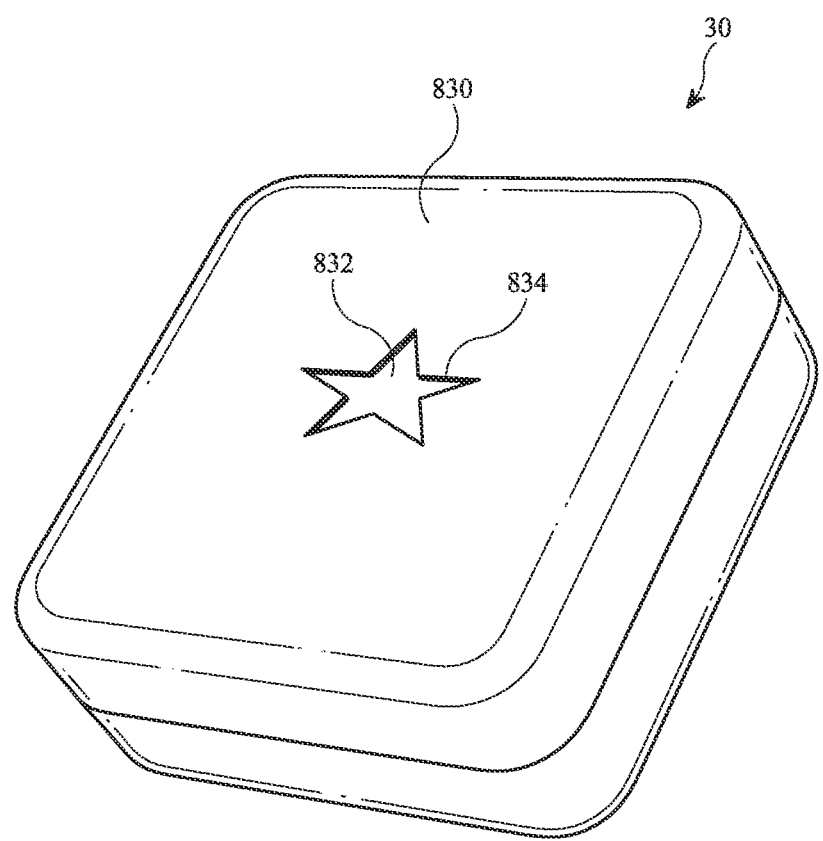
FIG. 36 shows a perspective view of a packaging system according to embodiments of the present invention.

In some embodiments packaging 10 or packaging 30 is wrapped in leather 830 (see, e.g., FIG. 36). For example, in some embodiments leather 830 may be steamed (e.g., saturated with water vapor or other vapor at high temperature) to temporarily increase its elasticity and then stretched over shell 110, 160, 310, and/or 360. An adhesive may be disposed between leather 830 and shell 110, 160, 310, and/or 360 to maintain leather 830 in shape over shell 110, 160, 310, and/or 360 after leather 830 dries.

As leather 830 dries, it may tend toward contracting in some areas, which could put stress on shell 110, 160, 310, and/or 360. To reinforce shell 110, 160, 310, and/or 360 against such stress, or to increase strength of shell 110, 160, 310, and/or 360 for other reasons, shell 110, 160, 310, and/or 360 may be formed of a high-strength material, for example, a glass-filled resin such as polycarbonate. Such a high strength material as glass-filled polycarbonate can help shell 110, 160, 310, and/or 360 maintain its shape (e.g., not warping or bowing) under tension applied by drying and dried leather 830, and under the effect of heat applied during the leather application process.

Figure 37:
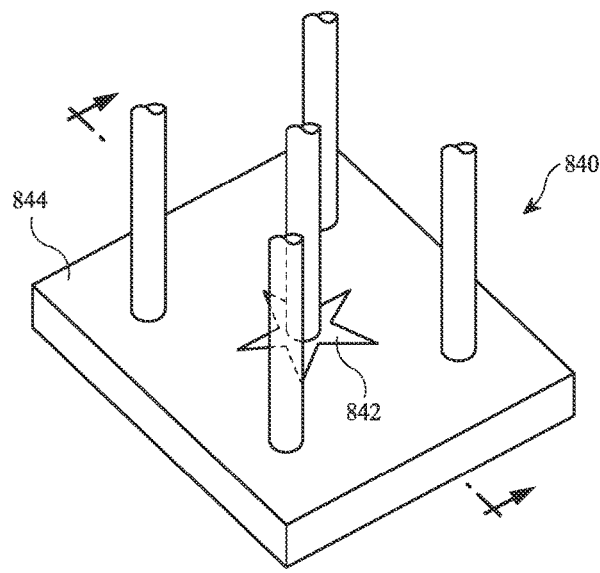
FIG. 37 shows a perspective view of a punch system according to embodiments of the present invention.
Figure 38:
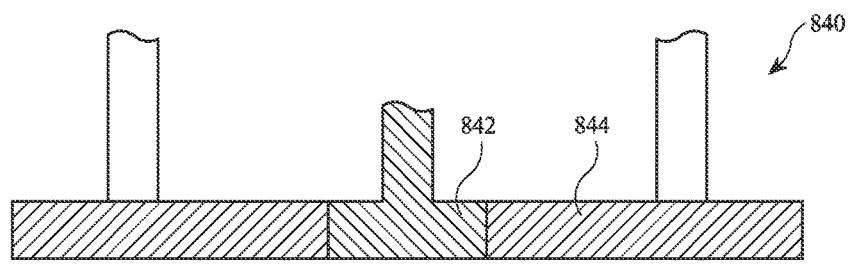
FIG. 38 shows a cross-sectional view of a punch system according to embodiments of the present invention.

In some embodiments, portions 832 of the leather may be debossed (e.g., to show text or a logo impressed into the leather). See, e.g., FIG. 36. To form such debossed areas, a supported punch 840 may be used. See, e.g., FIGS. 37-39. Such supported punch 840 may include one or more punches 842 in the shape(s) to be debossed, and a support plate 844 surrounding and abutting at least a portion of punch 842 (including, for example, the entire perimeter(s) of punch(es) 842 as shown in FIG. 37). To deboss leather 830, supported punch 840 may be lowered onto the surface of leather 830 to compress leather 830 in that area. Punch 842 may be forced onto leather 830 a greater distance than support plate 844, to deboss the portion of leather 832 in contact with punch 842 (i.e., to lower the surface of leather 830 in debossed areas 832 relative to the rest of leather 830).

Figure 39:
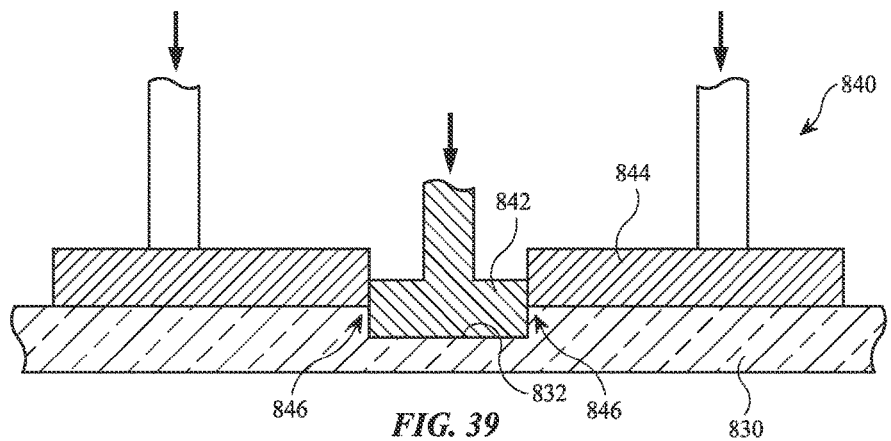
FIG. 39 shows a cross-sectional view of a punch system according to embodiments of the present invention.

Upon compressing leather 830 beneath punch 842, leather 830 immediately outside of the area beneath punch 842 may tend to deform due to the pressure applied by punch 842. For example, surrounding leather may curve downward to transition to the compressed level of the debossed area, and/or may bunch up around the debossed area 832 due to compressive forces causing the leather below punch 842 to bulge out at its sides. Support plate 844 may help control this deformation by constraining the area surrounding debossed area 832. For example, leather around debossed area 832 cannot bunch up higher than its original level where support plate 844 is held at that level, as shown in FIG. 39. Instead of bunching up, this leather is forced into edge corners 846 formed at the interface between punch 842 and support plate 844. This forms a clean, crisp upper edge 834 to the debossed area 832, which can increase its definition and visibility on packaging 30.

Figure 40:
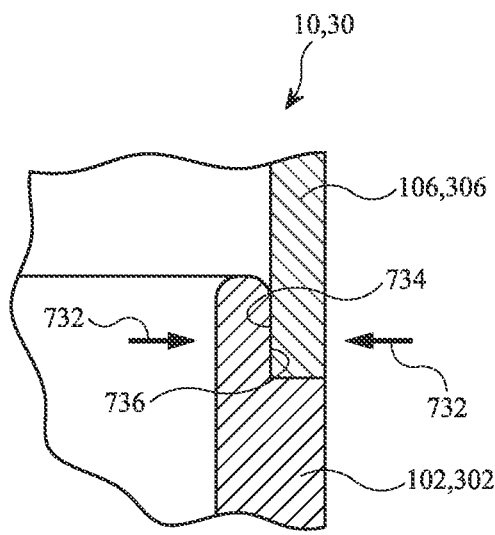
FIG. 40 shows a cross-sectional view of mating portions of a packaging system according to embodiments of the present invention.
Figure 41:
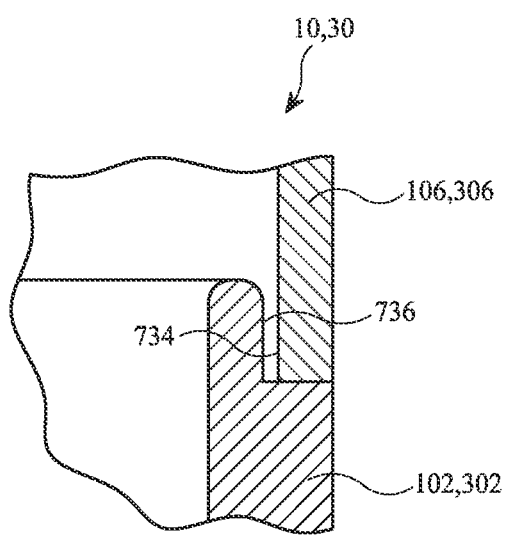
FIG. 41 shows a cross-sectional view of mating portions of a packaging system according to embodiments of the present invention.

In some embodiments lid assembly 106, 306 engages with base assembly 102, 302 by a friction fit between side portions of lid assembly 106, 306 and base assembly 102, 302 that overlap, to form closed packaging 10, 30. An example of such a friction fit is illustrated in FIG. 40, which is a cross-sectional view of the mating portions of lid assembly 106, 306 and base assembly 102, 302. The lateral force 732 applied between contacting sides 734 and 736 of lid assembly 106, 306 and base assembly 102, 302 produces a frictional force therebetween that tends to retain lid assembly 106, 306 on base assembly 102, 302. Such closed packaging 10, 30 can be opened by applying a separating force that overcomes the friction force. Such friction fit may be around the entire perimeter of packaging 10, 30, or may be only in portions of packaging 10, 30. For example, in some embodiments corner curves 108, 308 of lid assembly 106, 306 and base assembly 102, 302 may be in clearance (i.e., not friction fit) when packaging 10, 30 is in the closed configuration, and only the straight sides 109, 309 (e.g., sides connecting the corners) may be engaged in a friction fit. See, e.g., FIGS. 2, 8, 12, 15. An example of such a clearance fit is illustrated in FIG. 41, which is a cross-sectional view of the mating portions of lid assembly 106, 306 and base assembly 102, 302. Since surfaces 734 and 736 are not in contact (or have no force generated therebetween due to their fit together) in such clearance fit, there is no frictional force therebetween tending to retain lid assembly 106, 306 on base assembly 102, 302. Including a friction fit along the sides 109, 309 of packaging 10, 30 and a clearance fit at corners 108, 308 thereof may help a user to align lid assembly 106, 306 on base assembly 102, 302 to close packaging 10, 30, and minimizes the potential for lid assembly 106, 306 to become stuck on base assembly 102, 302 (e.g., due to misalignment among corners 108, 308). In some embodiments a friction fit may be used only along one pair of opposing sides 109, 309, and a clearance fit elsewhere around the perimeter of packaging 10, 30. This configuration may be particularly useful where one pair of opposing sides 109, 309 is longer than another pair 109, 309, as in packaging 10. For example, long sides 109 of packaging 10 may engage together with a friction fit in the closed configuration, while the rest of the perimeter of packaging 10 may be in clearance. This can help keep lid assembly 106, 306 from pinching on the shorter sides of base assembly 102, 302 when a user is attempting to remove lid assembly 106, 306 from base assembly 102, 302.

The fit about the perimeter of packaging 10, 30, may be tailored by tailoring the draft angles of mating portions to make the portions interfere where a friction fit is desired, or not interfere where a clearance fit is desired. Such draft angles may increase or decrease gradually so as not to present a visual or tactile interruption. Other dimensions may be changed to similarly accomplish such targeted areas of friction fit and clearance as described.

In some embodiments lid assembly 106, 306 and base assembly 102, 302 do not engage with a friction fit, but there is a clearance between their overlapping sides around the entire perimeter of packaging 10, 30. Such clearance may be desirable when, for example, packaging 10, 30 is wrapped in leather 830. The clearance can minimize leather-on-leather contact to protect the leather and to provide a smoother opening and closing operation (e.g., minimize tackiness or sticking).

Figure 42:
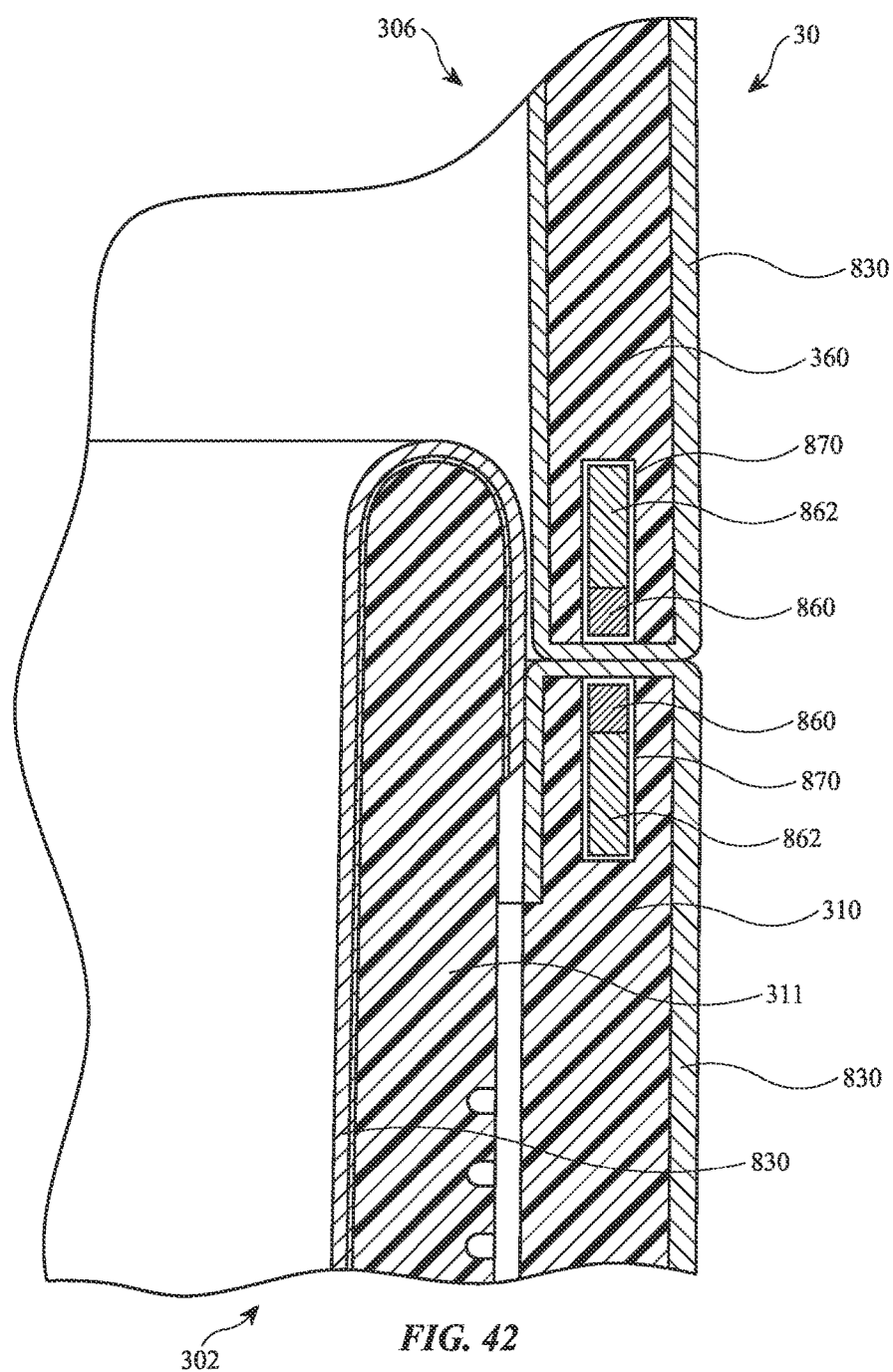
FIG. 42 shows a cross-sectional view of mating portions of a packaging system according to embodiments of the present invention.

In some embodiments—for example, those where lid assembly 106, 306 and base assembly 102, 302 have clearance between their overlapping sides—lid assembly 106, 306 and base assembly 102, 302 may be retained together in the closed configuration by magnetic forces. Such magnetic forces may be induced by attraction between magnets 860 embedded within lid shell 160, 360 and base shell 110, 310, as shown, for example, in FIG. 42, which is a cross-sectional view of the mating portions of lid assembly 306 and base assembly 302. Such magnets 860 may be, for example, Neodymium magnets (e.g., N45 magnets), and in some embodiments may be shunted (i.e., may include a shunt 862). As shown in FIG. 42, in some embodiments magnets 860 may be embedded in slots 870 around the perimeter of lid shell 360 and base shell 310, in locations that line up when packaging 30 is closed (i.e., locations that, when packaging 30 is closed, are within a magnetic field range of each other). In this way, when packaging 30 is closed magnets 860 of lid assembly 306 will come into proximity with magnets 860 of base assembly 302, and lid assembly 306 will be held in place on base assembly 302 by attractive forces between magnets 860. Such closed packaging 30 can be opened by applying a separating force that overcomes the magnetic force. Such magnetic closure features as described herein may also be applied to packaging 10.

In some embodiments magnets 860 are embedded within slots 870 in the mating perimeters of lid shell 360 and base shell 310 (e.g., potted therein with, for example, glue). In some embodiments some magnets 860 described above may be replaced with a material that is attracted to magnets (e.g., a ferromagnetic or ferrimagnetic material), so that the magnetic force is produced between a magnet 860 and a material that is attracted to magnets, instead of or in addition to between magnets 860. In some embodiments, magnetic attraction as described may be combined with a friction fit between lid assembly 306 and base assembly 302. In some embodiments, magnets 860 are magnetized after being embedded within lid shell 360 and/or base shell 310, and in some embodiments after lid shell 360 and/or base shell 310 are wrapped in leather 830. This can help ensure that magnetization of magnets 860 is not degraded by manufacturing and assembly processes (e.g., heat applied while wrapping lid shell 360 and base shell 310 in leather 830).

Embodiments described herein describe packaging 10, 30 and structures thereof that help retain item 60 therein, so that item 60 is retained by closed packaging 10, 30 itself, and not additional structures or mechanisms therein or attached thereto. In other words, packaging 10, 30 may not include separate ties, clips, etc. that must be removed before item 60 can be removed from packaging 10, 30 for the first time, but item 60 is able to be held securely in place just by the structure of packaging 10, 30 as described above (e.g., raised boundary 136, 146, magnet 150, cavity 126, sidewall 128, clip assembly 350, indentations 344, 382, and the fit together of lid assembly 106, 306 and base assembly 102, 302). The absence of such additional retention mechanisms contributes to an impression that item 60 is floating within packaging 10, 30, and makes item 60 immediately available for use upon opening packaging 10, 30. It also contributes to packaging 10, 30's use as a case, since the retention features are built-in and a permanent part of packaging 10, 30 throughout its life. This makes item 60 just as secure within packaging 10, 30 upon re-use of packaging 10, 30 as a case as it was when initially packaged at the factory.

Figure 43:
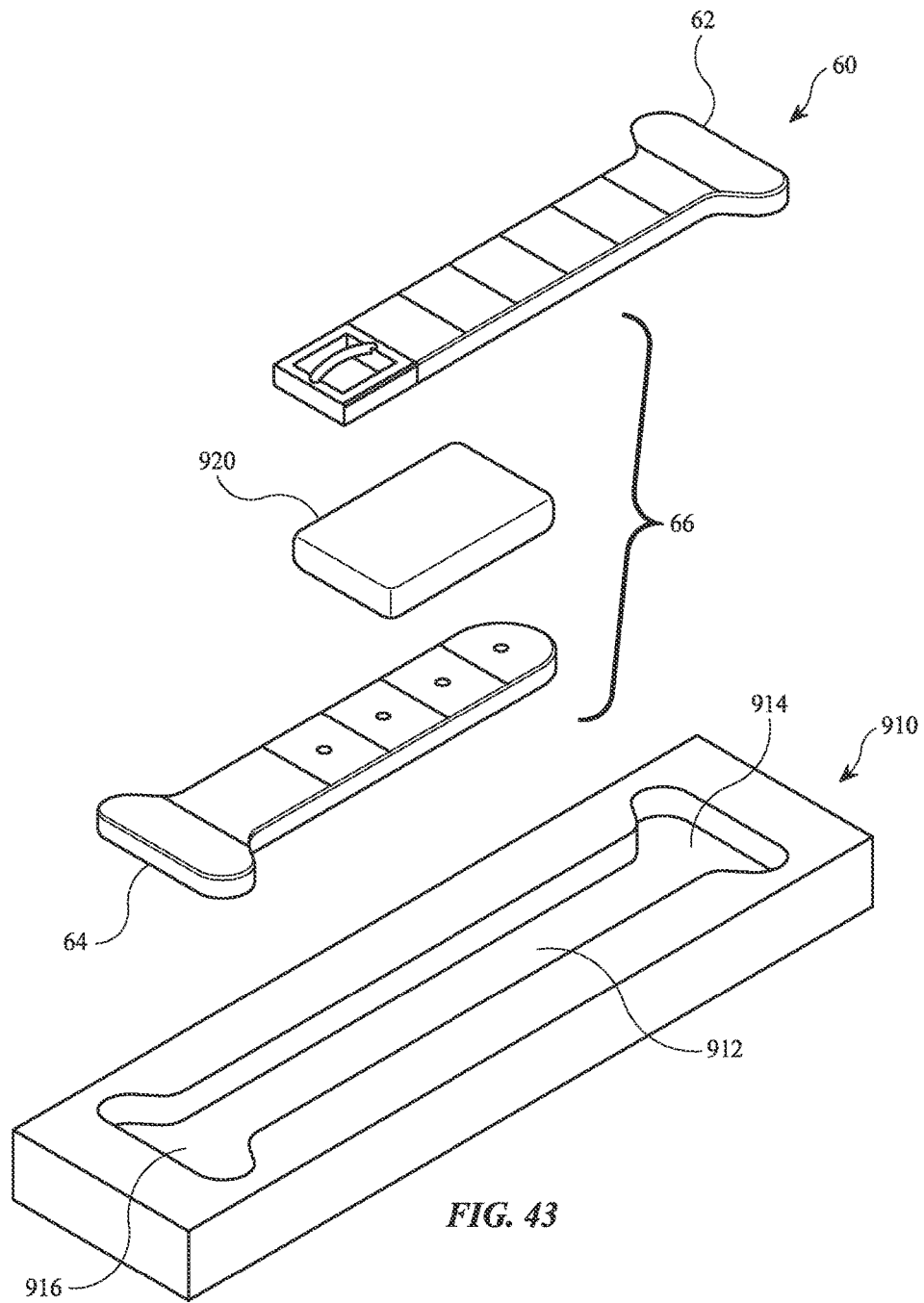
FIG. 43 shows a perspective view of a packaging system according to embodiments of the present invention.

FIG. 43 illustrates packaging 910 according to some embodiments of the present invention. Packaging 910 may be used to hold an item 60 which may be, for example a watch band or bracelet. Packaging 910 may include a cavity 912 within which item 60 is retained. Ends 62, 64 of item 60 may be retained at ends 914, 916 of cavity by, for example, a press-fit. Some items 60 may have overlapping portions 66 between ends 914, 916 of cavity 912. For example, a watch band formed in two parts may have lug ends retained at ends 914, 916 of cavity 912, and free ends that overlap between ends 914, 916 of cavity 912. To reduce the potential for abrasion between overlapping portions 66 of item 60, packaging 910 may include a pad 920 therebetween. Pad 920 may be formed of a cushioning material with a tacky exterior, so that it will provide protection and stay in place. For example, pad 920 may be formed of Mylar co-molded within silicon.

Subject matter related to that disclosed herein is disclosed in U.S. Provisional Application No. 62/045,476, filed on Sep. 3, 2014, titled "Packaging for an Electronic Device," which is incorporated herein in its entirety by reference thereto.

The foregoing descriptions of the specific embodiments described herein are presented for purposes of illustration and description. These exemplary embodiments are not intended to be exhaustive or to limit the embodiments to the precise forms disclosed. All specific details described are not required in order to practice the described embodiments.

It will be apparent to one of ordinary skill in the art that many modifications and variations are possible in view of the above teachings, and that by applying knowledge within the skill of the art, one may readily modify and/or adapt for various applications such specific embodiments, without undue experimentation, without departing from the general concept of the present invention. Such adaptations and modifications are intended to be within the meaning and range of equivalents of the disclosed embodiments, based on the teaching and guidance presented herein.

The Detailed Description section is intended to be used to interpret the claims. The Summary and Abstract sections may set forth one or more but not all exemplary embodiments of the present invention as contemplated by the inventor(s), and thus, are not intended to limit the present invention and the appended claims.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The phraseology or terminology used herein is for the purpose of description and not limitation, such that the terminology or phraseology of the present specification is to be interpreted by the skilled artisan.

The breadth and scope of the present invention should not be limited by any of the above-described exemplary embodiments, but should be defined only in accordance with the claims and their equivalents.

What is claimed is:

1. Packaging, comprising:
a base shell containing a surface for receiving an item;
a charging coil disposed above the item-receiving surface;
a post rotatably coupling the charging coil to the base shell so that the charging coil and a central axis of the post can tilt relative to the base shell; and
an electrical port coupled to the base shell and accessible from an outer side of the base shell, wherein the electrical port is electrically connected to the charging element.

2. The packaging of claim 1, further comprising a tray disposed within a cavity formed by the base shell, wherein the tray defines the item-receiving surface.

3. The packaging of claim 1, wherein the charging coil is a part of a circular puck.

4. The packaging of claim 1, wherein the charging coil is an inductive charging coil.

5. The packaging of claim 1, wherein the item-receiving surface defines an indentation that is aligned with a charging surface of a charging element that contains the charging coil.

6. The packaging of claim 1, wherein the charging coil encircles a magnet.

7. The packaging of claim 1, wherein the charging coil is tilted toward a center of the base shell when in a neutral position, and
wherein the charging coil tilts away from the center of the base to contact an item when the item is placed next to the charging-coil.

8. The packaging of claim 1, wherein the item-receiving surface defines an indentation that is aligned with a charging surface of a charging element that contains the charging coil,
wherein the charging element is tilted toward a center of the base shell when in a neutral position, and
wherein the charging element tilts away from the center of the base to contact an item when an item is placed in the indentation.

9. The packaging of claim 1, wherein the charging coil is tilted toward a center of the base shell when in a neutral position, and
wherein the charging coil tilts away from the center of the base to contact an item when the item is placed next to the charging-coil, due to magnetic attraction between the charging coil and the item.

10. The packaging of claim 1, wherein the charging coil is spaced apart from the item-receiving surface by the post.

11. The packaging of claim 1, wherein the item-receiving surface defines an opening therethrough, and
wherein the post extends through the opening.

12. The packaging of claim 1, wherein the electrical port is configured to receive power from an outside power source.

13. The packaging of claim 1, wherein the electrical port is electrically connected to the charging coil through the post.

14. The packaging of claim 1, further comprising a lid configured to cover and enclose the item on the item-receiving surface.

15. Packaging, comprising:
a base shell defining a cavity;
a tray assembly disposed in the cavity and defining an item-receiving surface, wherein the item-receiving surface comprises a raised boundary spaced inward from an outer perimeter of the item-receiving surface; and
a magnet disposed within the cavity between the base shell and the tray assembly,
wherein the magnetic field of the magnet extends above the upper item-receiving surface of the tray assembly, and
wherein the position of the magnet coincides with the center of the area within the raised boundary.

16. The packaging of claim 15, wherein the magnetic field of the magnet is configured to retain the item relative to the base shell by magnetic attraction between the magnet and the item.

17. The packaging of claim 15, wherein the tray assembly comprises a tray disposed in the cavity between the base shell and the item-receiving surface,
wherein the tray defines an opening therethrough, and
wherein the magnet is disposed within the opening.

18. The packaging of claim 15, wherein the base shell has an inner surface defining a portion of the first cavity,
wherein a second cavity is formed in the inner surface, and
wherein the magnet is disposed within the second cavity.

19. The packaging of claim 15, wherein the tray assembly is fixed to a bottom surface of the cavity.

20. The packaging of claim 15, wherein the magnet is fixed in position below and within the raised boundary.

21. The packaging of claim 15, further comprising a charging element disposed below the item-receiving surface.

22. The packaging of claim 15, further comprising a charging element, wherein the charging element comprises the magnet.

23. A method for providing power to a device, the method comprising:
tilting a charging element from a neutral position to a charging position, under force of magnetic attraction of the charging element to a device; and
transferring power to the device from the charging element when the charging element is in the charging position,
wherein the magnetic force overcomes a biasing force applied by a support structure for the charging element,
wherein the charging element includes an inductive coil, and power is transferred to the device via an electromagnetic field, and
wherein the charging element is coupled to an upper end portion of a post, and wherein tilting of the charging element from the neutral position to the charging position is accomplished by rotation of the charging element and the post together about an axis extending transversely through a lower end portion of the post.

24. The method of claim 23, wherein rotation of the charging element and the post occurs in response to the force of magnetic attraction between the charging element and the device.

25. The method of claim 23, wherein tilting of the charging element from the neutral position to the charging position takes place automatically in response to the device being placed in proximity to the charging element.

26. The method of claim 23, wherein the charging element maintains the neutral position in the absence of the device.

* * * * *

UNITED STATES PATENT AND TRADEMARK OFFICE
CERTIFICATE OF CORRECTION

PATENT NO. : 10,283,996 B2  
APPLICATION NO. : 14/835396  
DATED : May 7, 2019  
INVENTOR(S) : Fetterman et al.

Page 1 of 1

It is certified that error appears in the above-identified patent and that said Letters Patent is hereby corrected as shown below:

In the Claims

In Column 24, Line 25 (Claim 7), change "charging-coil." to --charging coil.--.

In Column 24, Line 39 (Claim 9), change "charging-coil," to --charging coil,--.

Signed and Sealed this  
Third Day of September, 2019

Andrei Iancu  
*Director of the United States Patent and Trademark Office*